(12) United States Patent
Saito et al.

(10) Patent No.: US 11,742,563 B2
(45) Date of Patent: Aug. 29, 2023

(54) BACKDOOR AND REAR GLASS

(71) Applicant: AGC Inc., Tokyo (JP)

(72) Inventors: Koichi Saito, Tokyo (JP); Satoshi Tokunaga, Tokyo (JP)

(73) Assignee: AGC INC., Tokyo (JP)

( * ) Notice: Subject to any disclaimer, the term of this patent is extended or adjusted under 35 U.S.C. 154(b) by 320 days.

(21) Appl. No.: 16/907,970

(22) Filed: Jun. 22, 2020

(65) Prior Publication Data

US 2020/0411947 A1 Dec. 31, 2020

(30) Foreign Application Priority Data

Jun. 28, 2019 (JP) .................. 2019-122180

(51) Int. Cl.
*H01Q 1/12* (2006.01)
*H01Q 7/00* (2006.01)
(Continued)

(52) U.S. Cl.
CPC ............ *H01Q 1/1278* (2013.01); *B60J 1/002* (2013.01); *B60J 1/18* (2013.01); *B60J 5/10* (2013.01); *H01Q 1/1271* (2013.01); *H01Q 1/325* (2013.01); *H01Q 7/00* (2013.01); *B62D 29/001* (2013.01)

(58) Field of Classification Search
CPC .. H01Q 1/1271; H01Q 1/1278; H01Q 1/3275; H01Q 1/1285; H01Q 1/32; B60J 1/002; B60J 1/18; B60J 5/10; B60J 5/107; B60S 1/026; B60S 1/586; H05B 3/84; H05B 3/86

See application file for complete search history.

(56) References Cited

U.S. PATENT DOCUMENTS 5,461,391 A * 10/1995 Ohnishi ............... H01Q 1/1278
343/704
5,959,586 A * 9/1999 Benham .................. H01Q 9/40
343/846

(Continued)

FOREIGN PATENT DOCUMENTS

EP 3 680 118 A 7/2020
JP H07-321529 A 12/1995
(Continued)

*Primary Examiner* — Ab Salam Alkassim, Jr.
*Assistant Examiner* — Leah Rosenberg
(74) *Attorney, Agent, or Firm* — Foley & Lardner LLP

(57) ABSTRACT

A backdoor includes a resin outer panel having an opening; a resin inner panel; a metal reinforcement arranged between the outer panel and the inner panel; and a rear glass covering the opening. The rear glass includes a defogger, and an antenna conductor capable of receiving radio waves in an AM band. The antenna conductor includes a power feeding part, and an antenna element having a predetermined length and connected to the power feeding part. The antenna element includes a proximity part extending along an outer edge among upper, lower, left, and right outer edges of the defogger, and having a predetermined spacing from the outer edge. The antenna element is positioned to be separated from the reinforcement by a predetermined spacing, or positioned on a side with respect to the outer edge where the reinforcement is not present in plan view of the rear glass.

20 Claims, 24 Drawing Sheets

(51) Int. Cl.
  *B60J 1/00* (2006.01)
  *B60J 1/18* (2006.01)
  *B60J 5/10* (2006.01)
  *H01Q 1/32* (2006.01)
  *B62D 29/00* (2006.01)

(56) References Cited

U.S. PATENT DOCUMENTS

| | | | | |
|---|---|---|---|---|
| 6,002,373 | A * | 12/1999 | Taniguchi | H01Q 1/1278 343/704 |
| 6,008,767 | A * | 12/1999 | Taniguchi | H01Q 1/1278 343/711 |
| 8,334,813 | B2 * | 12/2012 | Tadokoro | H01Q 1/1278 343/704 |
| 2010/0220020 | A1 | 9/2010 | Tadokoro et al. | |
| 2011/0115681 | A1 * | 5/2011 | Oshima | H01Q 5/40 343/713 |
| 2016/0359219 | A1 | 12/2016 | Araki et al. | |
| 2017/0279182 | A1 * | 9/2017 | Hayashi | H01Q 1/1278 |
| 2019/0190117 | A1 * | 6/2019 | Morishita | B60J 1/00 |
| 2021/0249754 | A1 * | 8/2021 | Tokuda | H01Q 21/30 |
| 2021/0257712 | A1 * | 8/2021 | Tokuda | H01Q 1/1278 |

FOREIGN PATENT DOCUMENTS

| | | | | |
|---|---|---|---|---|
| JP | H10-013128 A | | 1/1998 | |
| JP | 2011-010082 A | | 1/2011 | |
| JP | 2015-056716 A | | 3/2015 | |
| JP | 2015056716 A | * | 3/2015 | |
| JP | 2017-175290 A | | 9/2017 | |
| JP | 2017-229010 A | | 12/2017 | |
| WO | WO-2008096751 A1 | * | 8/2008 | H01Q 1/1278 |
| WO | WO-2015/133276 A1 | | 9/2015 | |
| WO | WO-2019/111996 A1 | | 6/2019 | |
| WO | WO-2019/177098 A1 | | 9/2019 | |
| WO | WO-2020105370 A1 | * | 5/2020 | |

* cited by examiner

FIG.6B
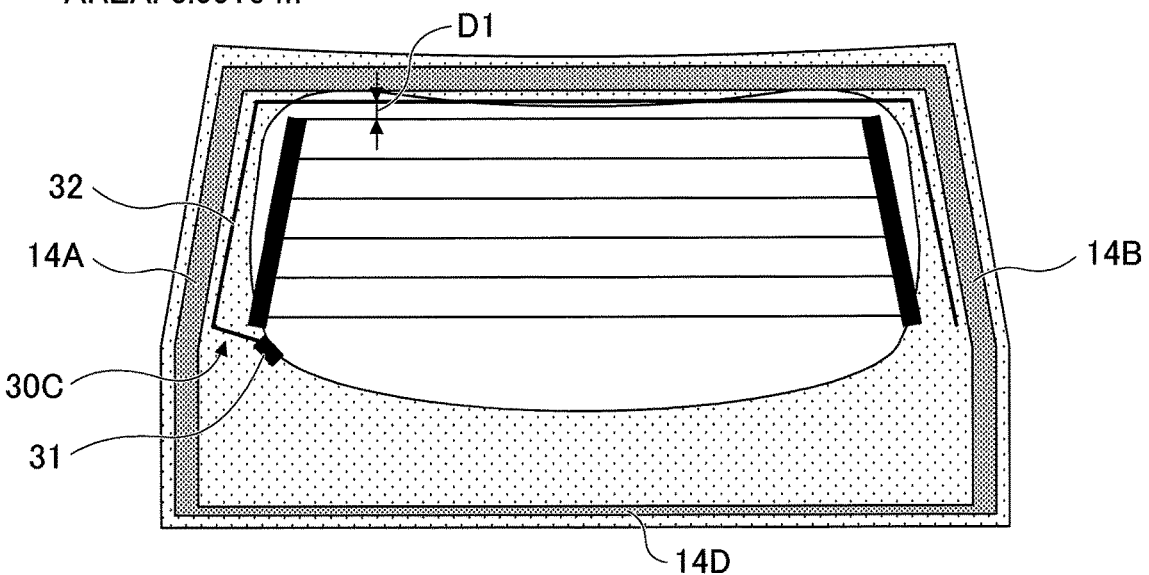
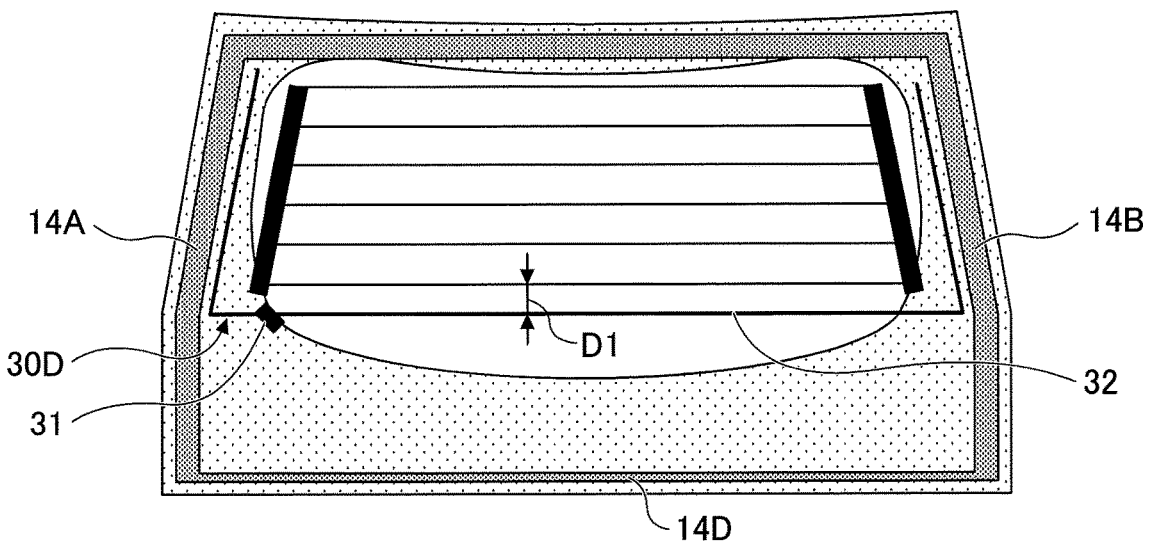

FIG.6C
(e) AREA: APPROX. 0.105 m²
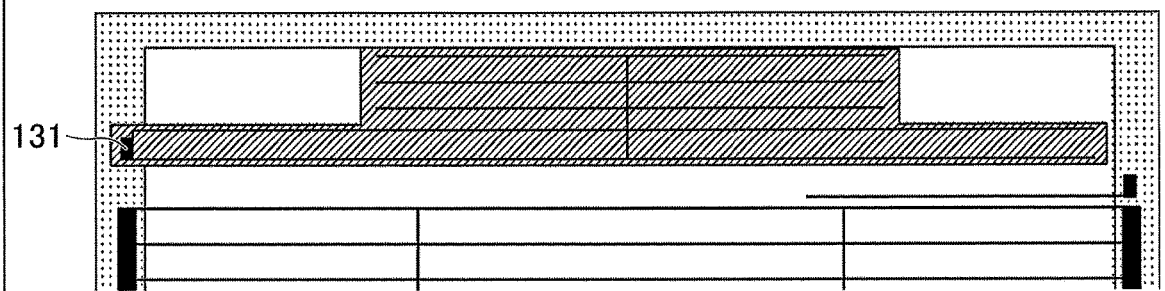
131
(f) AREA: APPROX. 0.06 m²
132
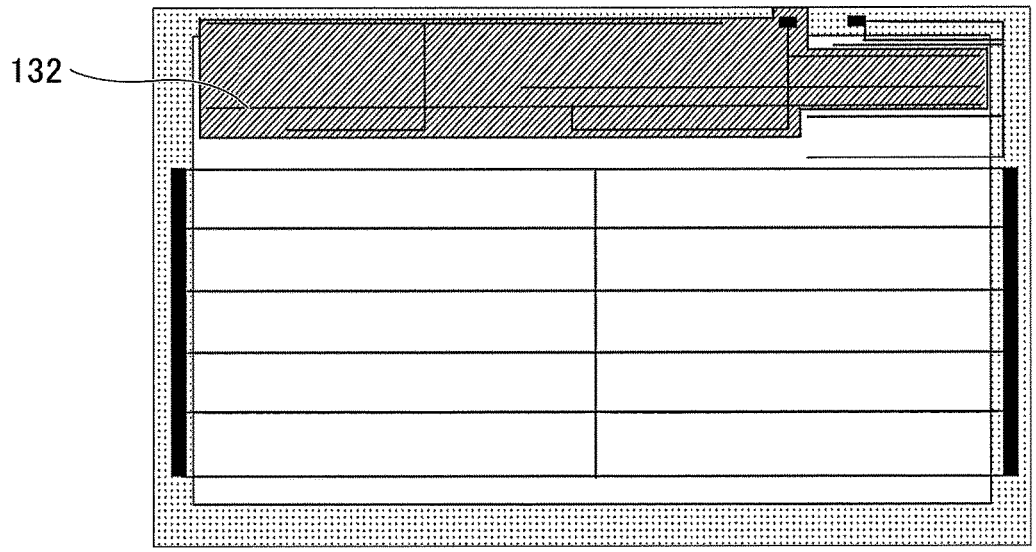

FIG.7A
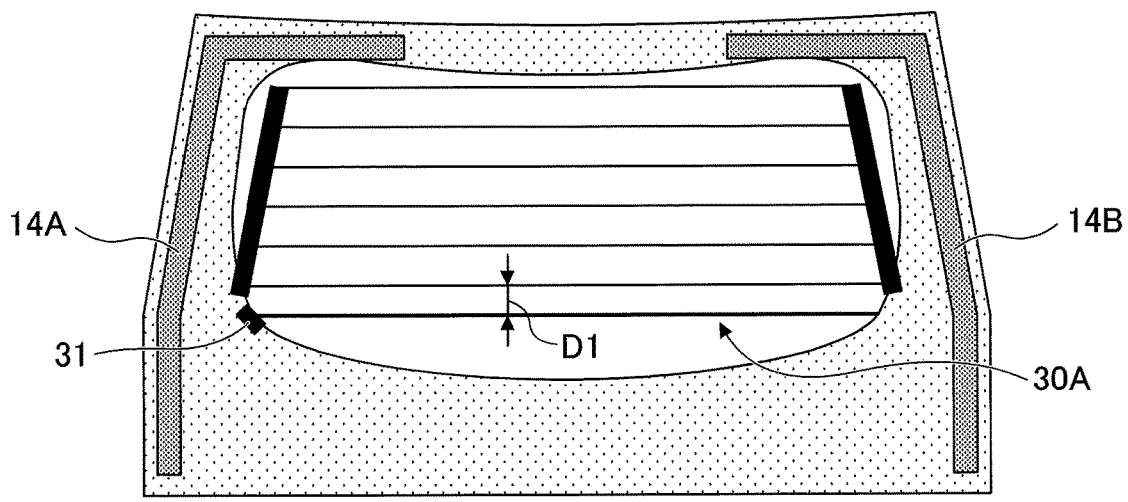
(g) LINE LENGTH: 800 mm, AREA: 0.0008 m²
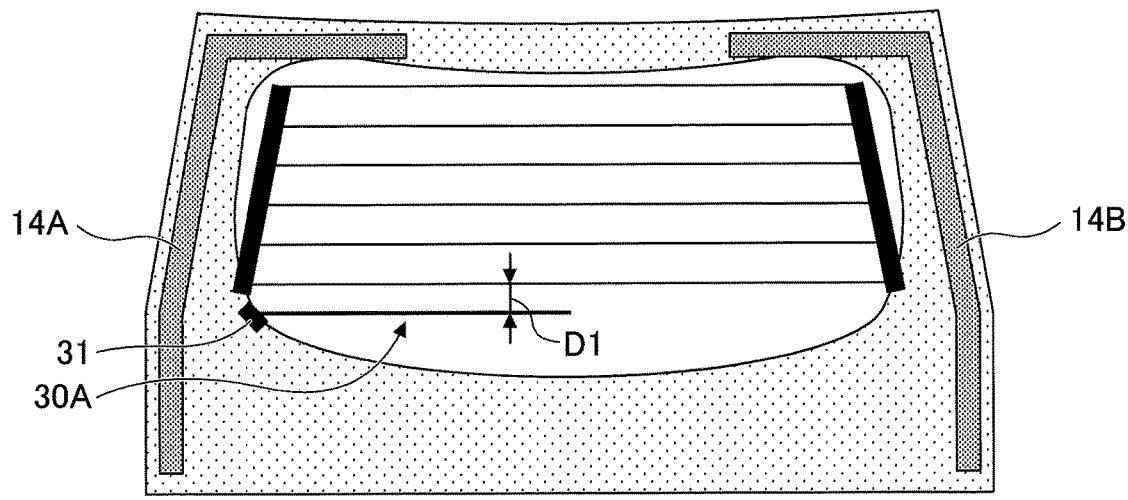
(h) LINE LENGTH: 400 mm, AREA: 0.0004 m²

FIG.7B
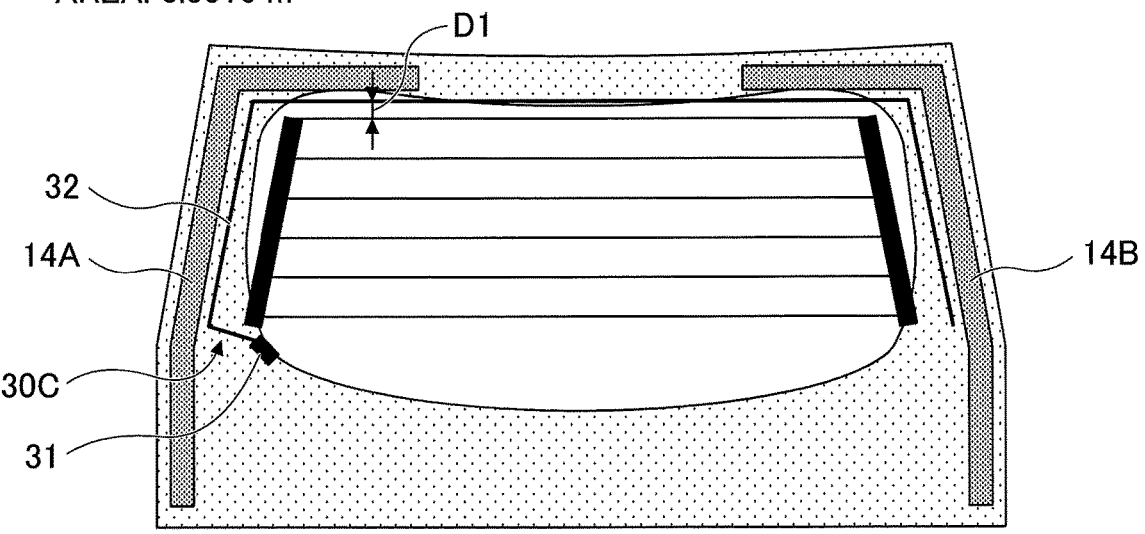
(i) LINE LENGTH: 1600 mm, AREA: 0.0016 m²
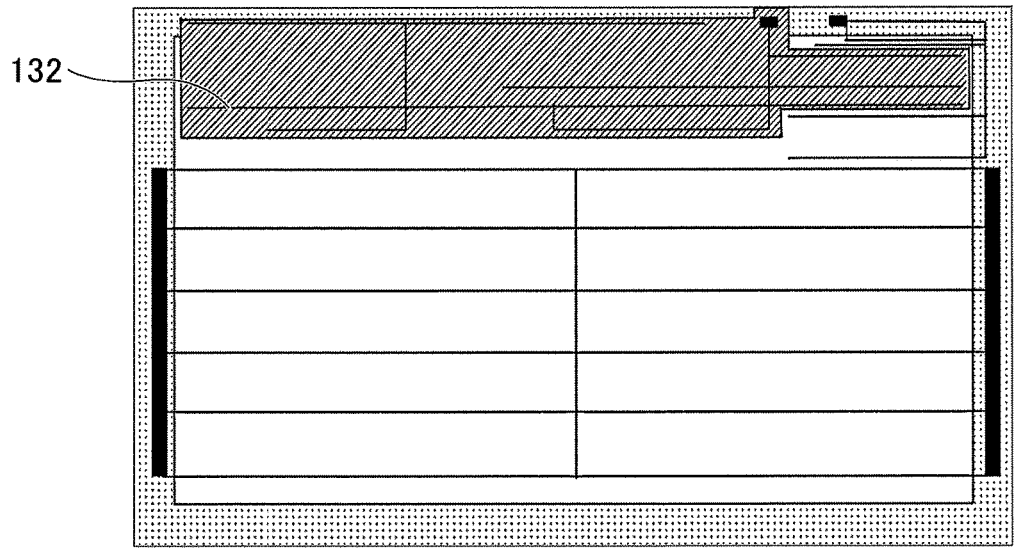
(f) AREA: APPROX. 0.06 m²

FIG.8A
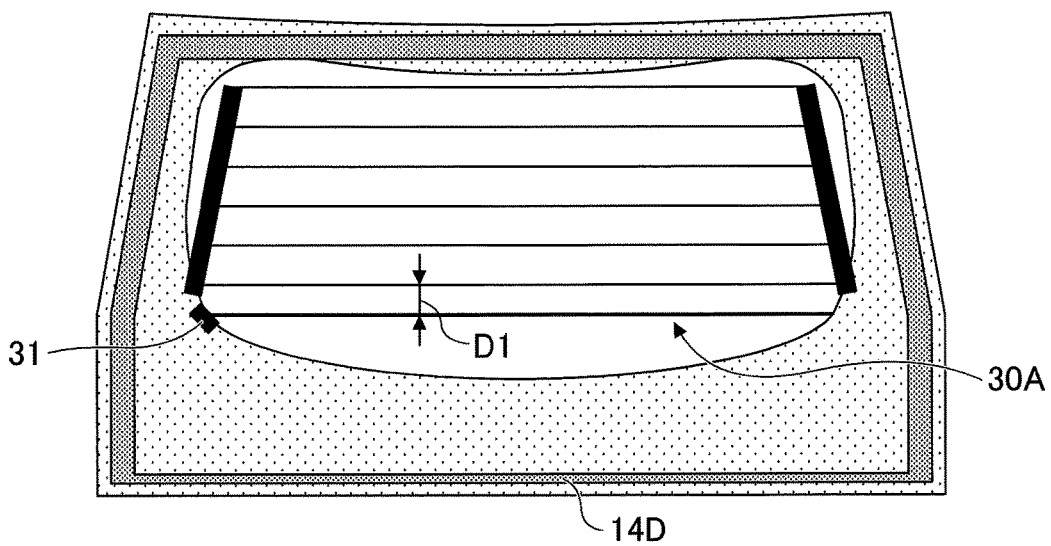
(a) LINE LENGTH: 800 mm,
    AREA: 0.0008 m²
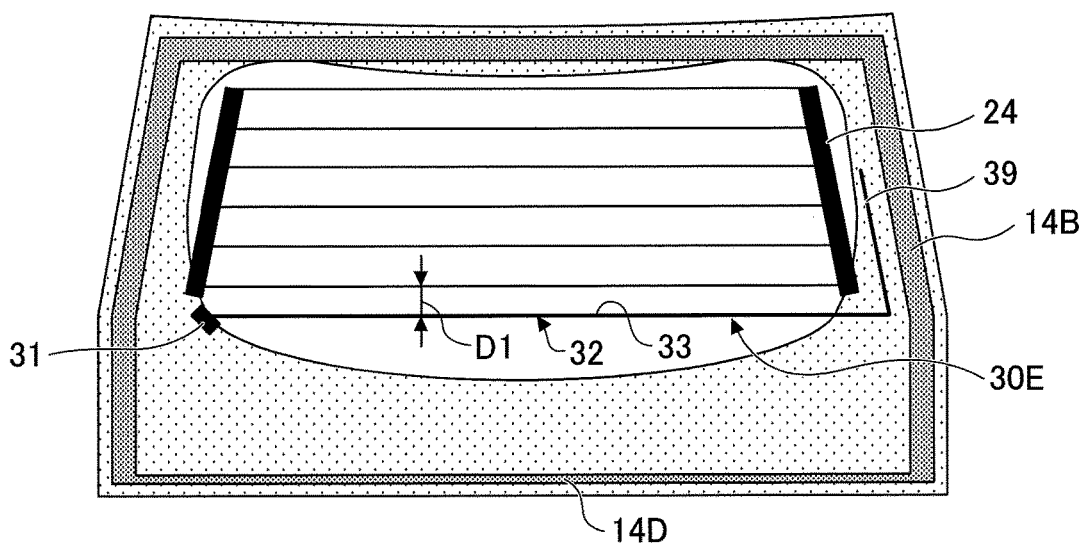
(b) LINE LENGTH: 1200 mm,
    AREA: 0.0012 m²

FIG.8B
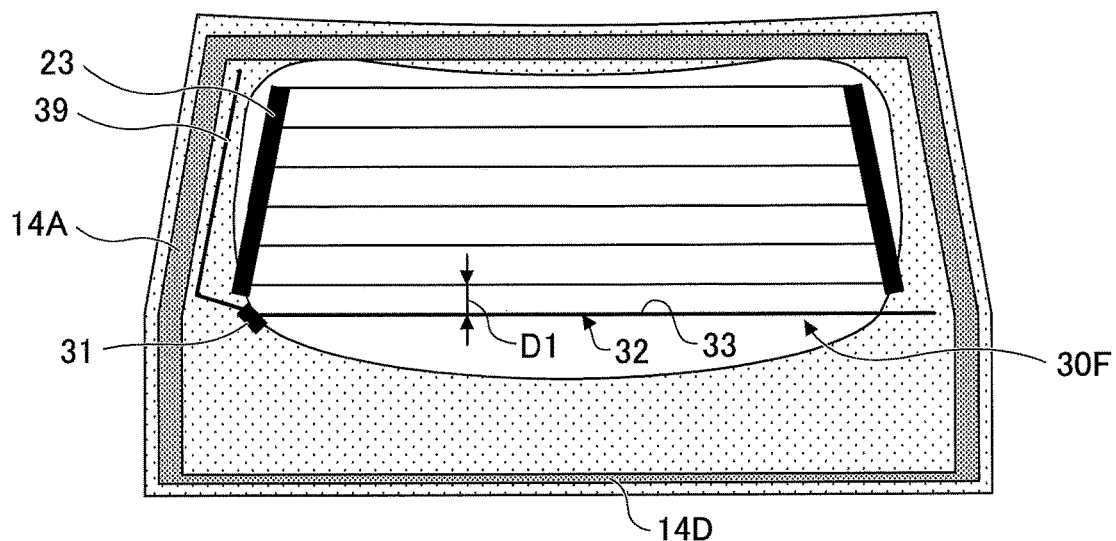
(c) LINE LENGTH: 1200 mm, AREA: 0.0012 m²
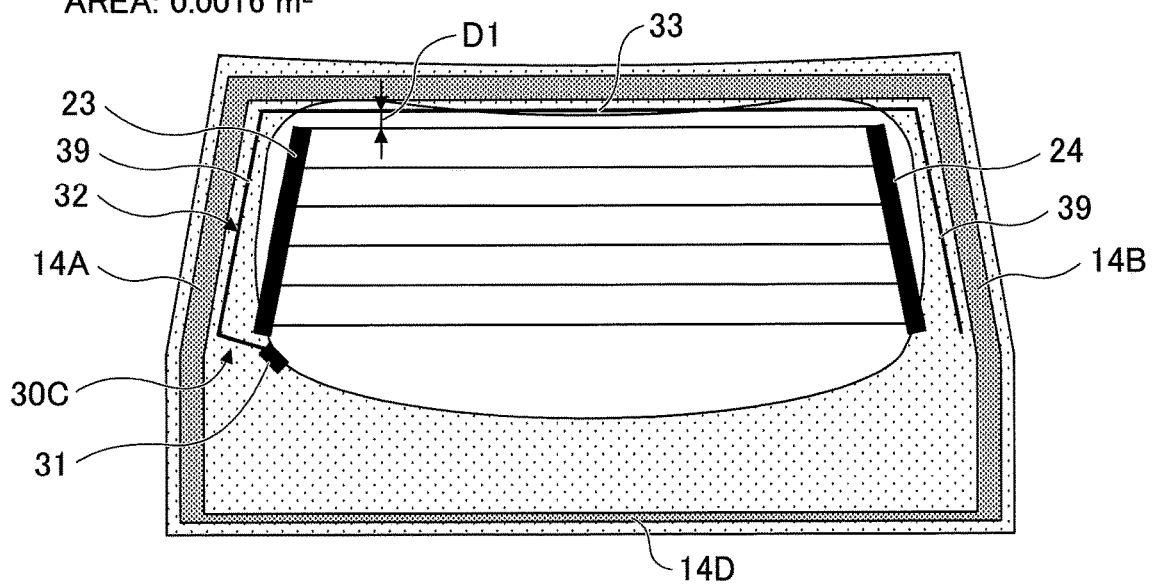
(d) LINE LENGTH: 1600 mm, AREA: 0.0016 m²

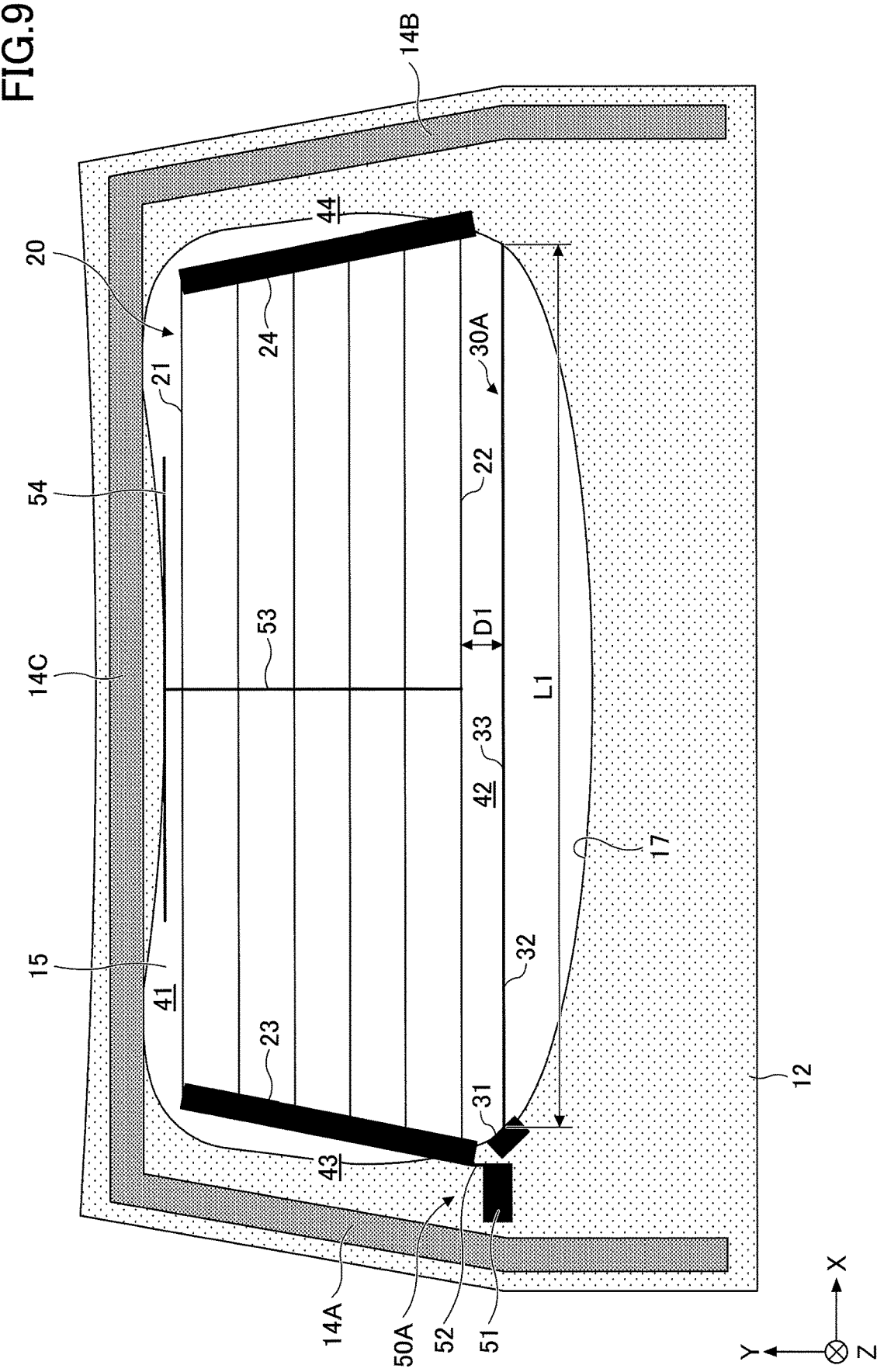

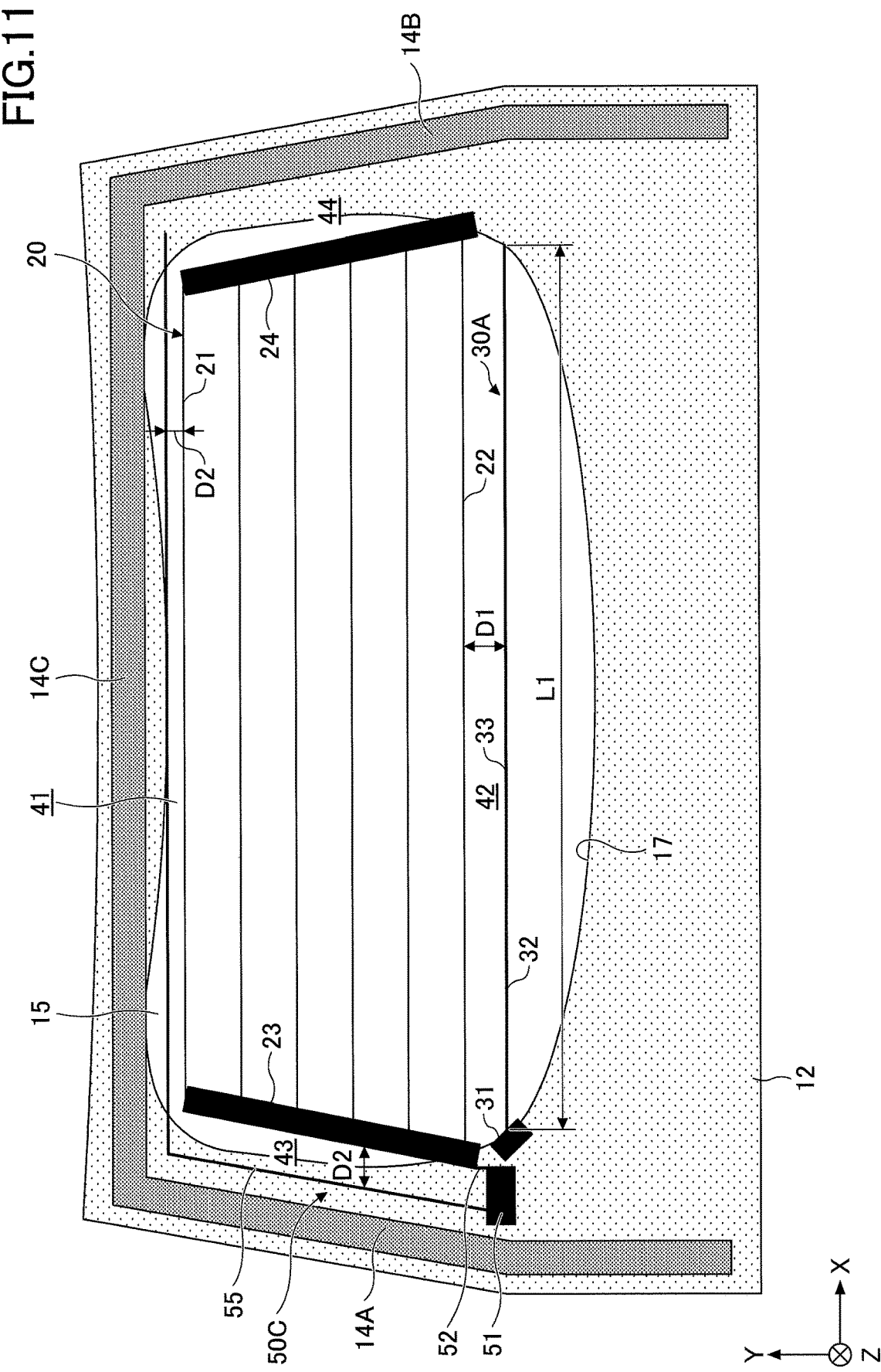

BACKDOOR AND REAR GLASS

CROSS-REFERENCE TO RELATED APPLICATIONS

The present application is based upon and claims the benefit of priority to Japanese Patent Application No. 2019-122180 filed on Jun. 28, 2019, the entire contents of which are hereby incorporated by reference.

BACKGROUND OF THE INVENTION

1. Field of the Invention

The present disclosure relates to a backdoor and a rear glass.

2. Description of the Related Art

Various functional components such as a defogger and an antenna are arranged in the rear glass of a vehicle, as long as the visibility is secured. However, in a vehicle specified to have a rear glass of a comparatively small size (area) by itself (e.g., a hatchback car), once securing a region for arranging a defogger, it may be difficult to secure a region for arranging an antenna for an AM broadcast band. Therefore, in order to arrange an antenna for an AM broadcast band, it is necessary to devise some ideas in relation to arrangement of a defogger. As such an antenna for an AM broadcast band, an antenna has been disclosed that is provided in a rear glass mounted on a backdoor made of resin having a reinforcement made of metal, and that has a conductor along at least three among four sides of the upper, lower, left, and right sides of the defogger (see, for example, Japanese Laid-Open Patent Application No. 2015-056716 (Patent Document 1)).

However, depending on the positional relationship among the defogger, antenna conductor, and reinforcement, the reception sensitivity in the AM broadcast band may decrease. Also, the size and shape of the rear glass of a vehicle vary depending on the type of vehicle. Therefore, it is often the case that securing of the arrangement region of an antenna conductor has a trade-off relationship with securing of the reception sensitivity in a predetermined AM broadcast band.

SUMMARY OF THE INVENTION

According to the present disclosure, a backdoor includes an outer panel made of resin and having an opening formed; an inner panel made of resin; a reinforcement made of metal and arranged between the outer panel and the inner panel; and a rear glass covering the opening. The rear glass includes a defogger, and a first antenna conductor capable of receiving a radio wave in a frequency band of AM broadcast waves. The first antenna conductor includes a first power feeding part, and a first antenna element having a total length of 100 mm to 1800 mm and connected to the first power feeding part. The first antenna element includes a first proximity part extending along a first outer edge among upper, lower, left, and right outer edges of the defogger, and having a spacing of 3 mm to 60 mm from the first outer edge. The first antenna element is positioned to be separated from the reinforcement by longer than or equal to 10 mm, or positioned on a side with respect to the first outer edge where the reinforcement is not present in plan view of the rear glass.

Also, according to the present disclosure, a rear glass that can be attached to a backdoor made of resin so as to cover an opening formed in the backdoor, and the backdoor having a reinforcement made of metal, includes a defogger; and a first antenna conductor capable of receiving a radio wave in a frequency band of AM broadcast waves. The first antenna conductor includes a first power feeding part, and a first antenna element having a total length of 100 mm to 1800 mm connected to the first power feeding part. The first antenna element includes a first proximity part extending along a first outer edge among upper, lower, left, and right outer edges of the defogger and having a spacing of 3 mm to 60 mm from the first outer edge. In a state of being attached to the backdoor, the first antenna element is positioned to be separated from the reinforcement by longer than or equal to 10 mm, or positioned on a side with respect to the first outer edge where the reinforcement is not present in plan view of the rear glass.

BRIEF DESCRIPTION OF DRAWINGS

FIG. 6B is a plan view schematically illustrating configuration examples of antenna conductors;

FIG. 6C is a plan view schematically illustrating configuration examples of antenna conductors;

FIG. 7A is a plan view schematically illustrating configuration examples of antenna conductors;

FIG. 7B is a plan view schematically illustrating configuration examples of antenna conductors;

FIG. 8A is a plan view schematically illustrating configuration examples of antenna conductors;

FIG. 8B is a plan view schematically illustrating configuration examples of antenna conductors;

FIG. 9 is a plan view schematically illustrating a fifth configuration example of a backdoor;

FIG. 11 is a plan view schematically illustrating a seventh configuration example of a backdoor;

DESCRIPTION OF THE PREFERRED EMBODIMENTS

In the following, embodiments according to the present disclosure will be described with reference to the drawings.

According to techniques in the present disclosure, a backdoor and a rear glass can be provided, with which it is possible to secure both the arrangement area of an antenna conductor and the reception sensitivity in an AM broadcast band.

Note that a direction described as being parallel, perpendicular, horizontal, vertical, orthogonal, longitudinal, lateral, and so forth, is assumed to have deviation to an extent not impairing effects of the present disclosure. Also, the X-axis direction, Y-axis direction, and Z-axis direction represent a direction parallel to the X-axis, a direction parallel to the Y-axis, and a direction parallel to the Z-axis, respectively. The X-axis direction, the Y-axis direction, and the Z-axis direction are orthogonal to each other. The XY-plane, YZ-plane, and ZX-plane represent a virtual plane parallel to the X-axis direction and the Y-axis direction, a virtual plane parallel to the Y-axis direction and the Z-axis direction, and a virtual plane parallel to the Z-axis direction and the X-axis direction, respectively.

Figure 1:
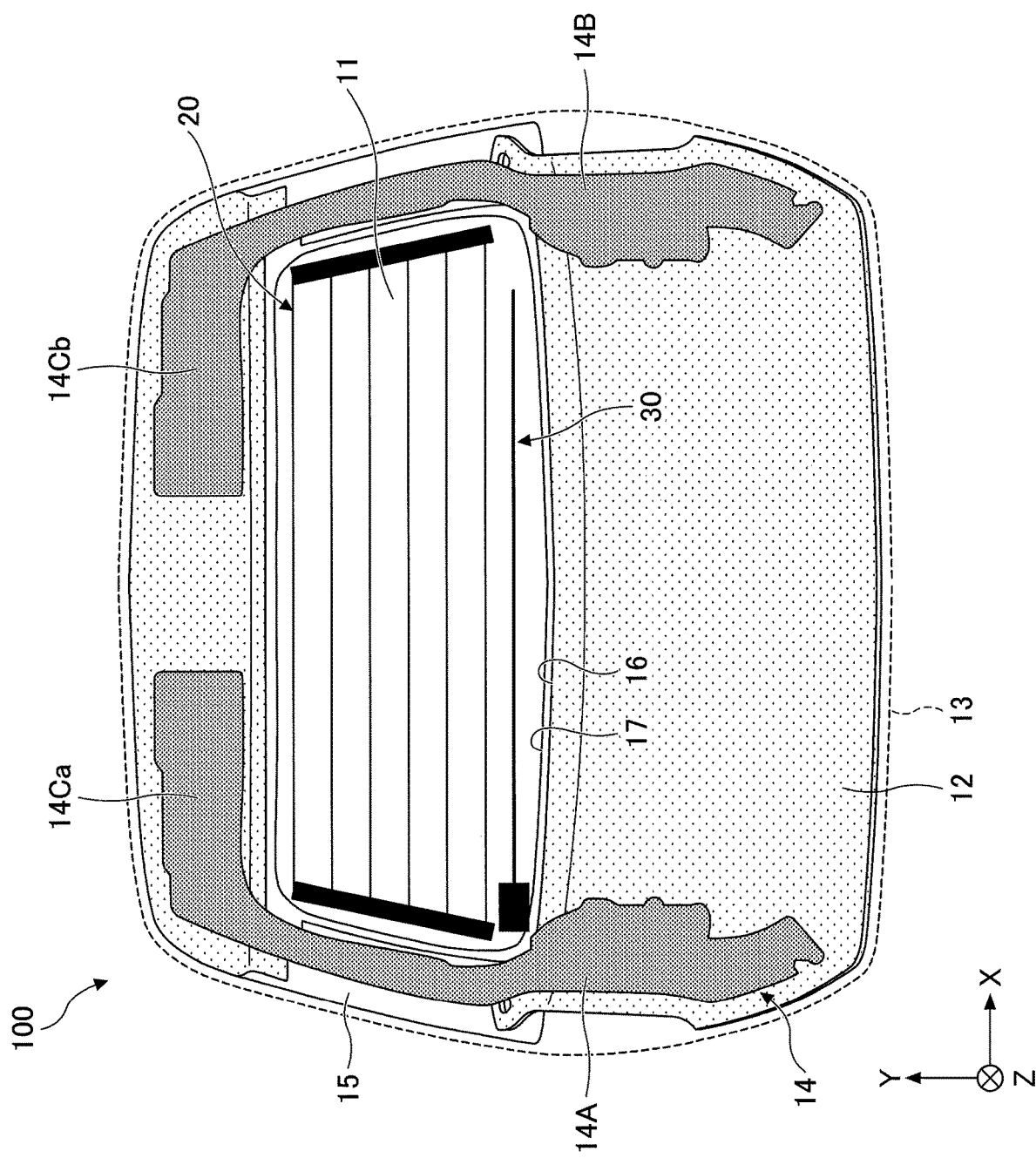
FIG. 1 is a plan view illustrating a first configuration example of a backdoor.

FIG. 1 is a plan view illustrating a first configuration example of a backdoor. A backdoor 100 illustrated in FIG. 1 is an opening/closing member made of resin that is attached to the rear of a vehicle to be openable and closeable. The backdoor 100 has an outer panel 12 made of resin, an inner panel 13 made of resin, a reinforcement 14 made of metal and arranged between the outer panel 12 and the inner panel 13, and a rear glass 15. The outer panel 12 and the inner panel 13 are molded of a synthetic resin such as polypropylene.

Note that FIG. 1 is a plan view illustrating the backdoor 100 from which the inner panel 13 is removed, as viewed from the interior side of the vehicle. Also, the shapes of the parts illustrated in FIG. 1 are merely examples, and the techniques in the present disclosure are not limited to the illustrated shapes.

An opening 11 is formed in the outer panel 12 that is covered by the rear glass 15. The rear glass 15 is attached to a window frame 16 formed on the outer panel 12. The window frame 16, which is also referred to as a flange, may be reinforced with metal. The outer panel 12 is constituted with one or more outer panel parts; in the example illustrated in FIG. 1, the outer panel 12 is constituted with an upper outer panel part and a lower outer panel part. The upper outer panel part coupled with the lower outer panel part via the reinforcement 14 forms the opening 11 in the outer panel 12. The opening 11 famed in the outer panel 12 is not limited to a form whose perimeter is entirely surrounded by the outer panel 12, and may have a form such that part of the perimeter is partially opened as illustrated in FIG. 1.

The reinforcement 14 is a metal member to reinforce the outer panel 12, and is fixed to the outer panel 12 so as to surround part or all of the opening 11. The reinforcement 14 is constituted with one or more members; in the example illustrated in FIG. 1, the reinforcement 14 is constituted with multiple members (a left reinforcement and a right reinforcement) separated on the left and right (in the vehicle width direction). The left reinforcement has a left reinforcement part 14A that extends in the left-side region of the opening 11 in the vertical direction, and an upper-left reinforcement part 14Ca that extends in the upper region of the opening 11 in the right direction from the upper end of the left reinforcement part. The right reinforcement has a right reinforcement part 14B that extends in the right-side region of the opening 11 in the vertical direction, and an upper-right reinforcement part 14Cb that extends in the upper region of the opening 11 in the left direction from the upper end of the right reinforcement part.

In the example illustrated in FIG. 1, although the left reinforcement part 14A and the upper-left reinforcement part 14Ca are formed of the same member, for example, two or more members may be coupled to form these parts. However, in a form in which the outer panel 12 is not constituted with an upper outer panel part and a lower outer panel part, for example, with one continuous panel part, the left reinforcement part 14A and the upper-left reinforcement part 14Ca may be separated. Also, although the left reinforcement part 14A overlaps the rear glass 15 and the opening 11 in plan view of the rear glass 15, it may be arranged so as not to overlap the rear glass 15 or the opening 11.

Similarly, in the example illustrated in FIG. 1, although the right reinforcement part 14B and the upper-right reinforcement part 14Cb are formed of the same member, for example, two or more members may be coupled to form these parts. However, in a form in which the outer panel 12 is not constituted with an upper outer panel part and a lower outer panel part, for example, with one continuous panel part, the right reinforcement part 14B and the upper-right reinforcement part 14Cb may be separated. Also, although the right reinforcement part 14B overlaps the rear glass 15 and the opening 11 in plan view of the rear glass 15, it may be arranged so as not to overlap the rear glass 15 or the opening 11.

The inner panel 13 is fixed to at least one of the outer panel 12 and the reinforcement 14 so as to cover the reinforcement 14. The inner panel 13 is formed so as not to obstruct the view through the rear glass 15.

The rear glass 15 is a window glass attached to the backdoor 100 so as to cover the opening 11 formed in the backdoor 100 made of resin. In the example illustrated in FIG. 1, although the rear glass 15 is attached to the exterior side of the vehicle (i.e., on the positive side in the Z-axis direction) with respect to the outer panel 12, it may be attached between the outer panel 12 and the inner panel 13. The rear glass 15 includes a defogger 20 and a first antenna conductor 30.

The defogger 20 is a conductor pattern of an electrically-heated type to defog the rear glass 15. The defogger 20 has multiple electric heating wires extending in the lateral direction (horizontal direction) of the rear glass 15, and multiple bus bars for feeding power to the multiple electric heating wires. In the example illustrated in FIG. 1, the multiple heating wires that are parallel to each other and extend in the lateral direction (horizontal direction) of the rear glass 15, and a pair of wide bus bars that are connected to both ends of the multiple heating wires, are provided in the rear glass 15. Once a voltage is applied between the pair of bus bars, the multiple heating wires are energized to be heated, and thereby, the rear glass 15 is defogged. Note that the defogger 20 is not limited to the case of using multiple electric heating wires extending in the horizontal direction. For example, the defogger 20 may be provided with heating wires that extend in the perpendicular direction (vertical direction) on the surface of the rear glass 15, and are positioned between a pair of bus bars that are positioned on the upper side and on the lower side of the defogger 20 and extend in the horizontal direction. Further, the defogger 20 may have a transparent or translucent conductive film coated between the pair of bus bars.

The shape and dimensions of the first antenna conductor 30 are designed to be capable of receiving radio waves at least in a frequency band of AM broadcast waves (e.g., higher than or equal to 500 kHz and lower than or equal to 1800 kHz). The shape and dimensions of the first antenna conductor 30 are not limited to be formed as in FIG. 1, as long as the first antenna conductor 30 is formed to be capable of receiving at least a frequency band of AM broadcast waves (AM broadcast band).

For example, the first antenna conductor 30 is formed to be suitable for receiving the MF (Medium Frequency) band including a frequency band of AM broadcast waves. Alternatively, the first antenna conductor 30 may be formed as a shared antenna element to receive both the MF and HF (High Frequency) bands. Note that the MF band represents a frequency band of higher than or equal to 300 kHz and lower than or equal to 3 MHz. The HF band represents a frequency band of higher than or equal to 3 MHz and lower than or equal to 30 MHz, which is also referred to as the SW (Short Wave) band.

Also, a light shielding film 17 to shield visible light may be formed at the outer periphery of the rear glass 15. As a specifics example of the light shielding film 17, ceramics such as a black ceramic film may be listed. Providing the light shielding film 17 makes it difficult to see a part of the rear glass 15 that is hidden in the light shielding film 17 in plan view from the exterior side of the vehicle; therefore, the design of the rear glass 15 and the vehicle is improved. For example, the rear glass 15 includes the light shielding film 17 that hides part of the reinforcement 14 and the window frame 16 in plan view of the rear glass 15 from the exterior side of the vehicle. In plan view of the rear glass 15 from the exterior side of the vehicle, part or all of antenna conductors such as the first antenna conductor 30 may be hidden by overlapping with the light shielding film 17, or part of the defogger may be hidden by overlapping with the light shielding film 17.

Figure 2:
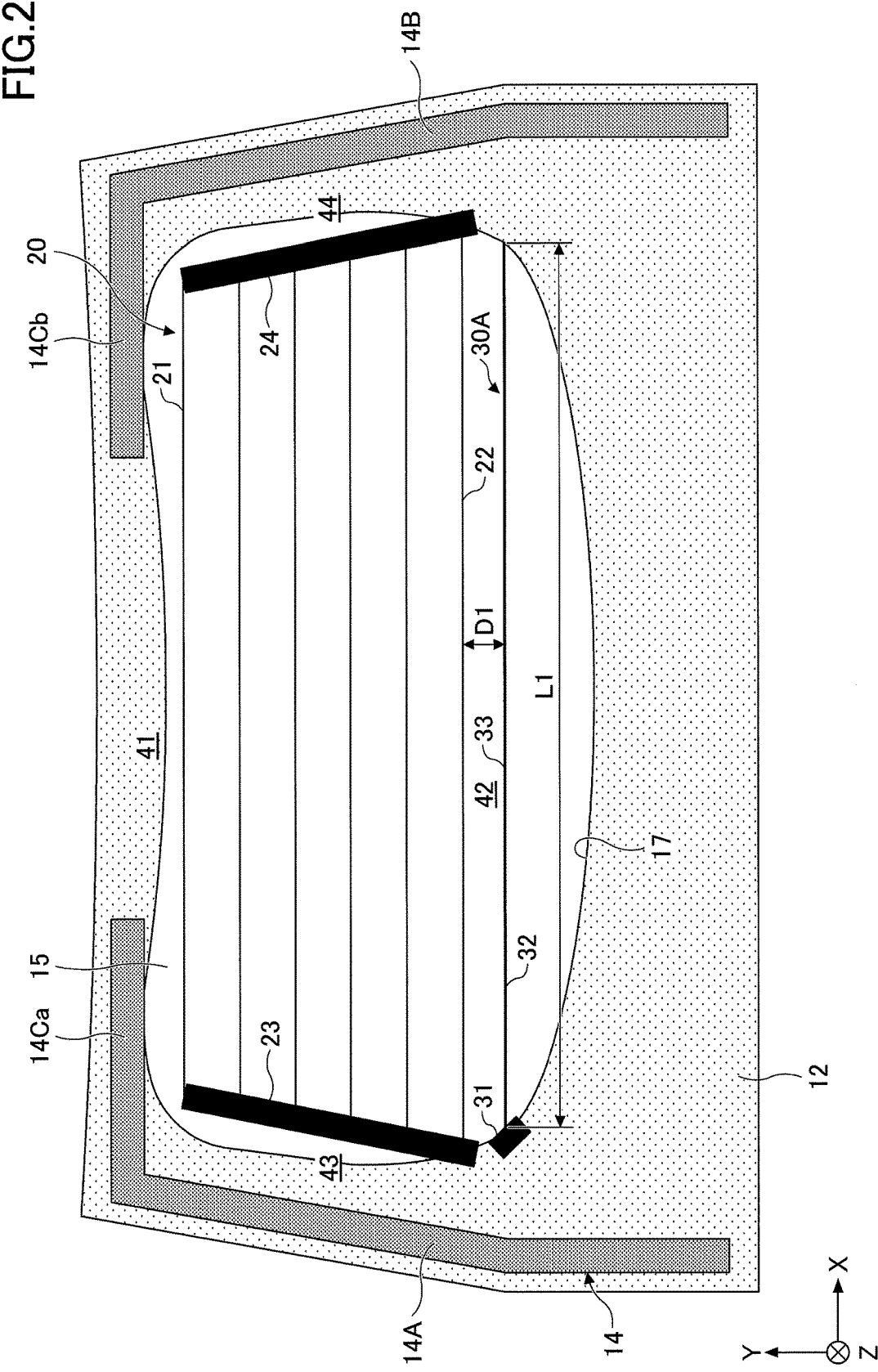
FIG. 2 is a plan view schematically illustrating a first configuration example of a backdoor.

FIG. 2 is a plan view schematically illustrating the first configuration example of the backdoor from which the inner panel 13 is removed, as viewed from the interior side of the vehicle. In FIG. 2, illustration of the outer edge of the rear glass 15 is omitted, and the film edge of the light shielding film 17 is illustrated. The defogger 20 has upper, lower, left, and right outer edges (upper edge 21, lower edge 22, left edge 23, and right edge 24), and a pair of wide bus bars present at the left edge 23 and at the right edge 24. The rear glass 15 has four (upper, lower, left, and right) peripheral regions 41 to 44 on the outside the defogger 20.

A first antenna conductor 30A corresponds to the first antenna conductor 30 illustrated in FIG. 1. The first antenna conductor 30A is arranged only in the peripheral region 42 located lower than the lower edge 22, among the four peripheral regions 41 to 44. The first antenna conductor 30A has a first power feeding part 31, and a first antenna element 32 having a total length of 100 mm to 1800 mm connected to the first power feeding part 31.

Note that in the example illustrated in FIG. 2, both the first power feeding part 31 and the first antenna element 32 are arranged only in the peripheral region 42 located lower than the lower edge 22, among the four peripheral regions 41 to 44. However, the first antenna element 32 may be arranged only in the peripheral region 42, and the first power feeding part 31 may be arranged in a region adjacent to the peripheral region 42 (e.g., the peripheral region 43 located further left than the left edge 23) or across these regions adjacent to each other.

A signal received by the first antenna element 32 is extracted from the first power feeding part 31. Then, the signal extracted from the first power feeding part 31 is transmitted to an input unit of an amplifier (not illustrated) through a conductive member that is electrically connected to the first power feeding part 31. As examples of the conductive member, power feeder cables such as an AV cable and a coaxial cable may be listed. The amplifier amplifies the signal extracted from the first power feeding part 31, and outputs the amplified signal to a signal processing circuit (not illustrated) mounted on the vehicle.

In the case of using a coaxial cable as the power feeder cable, the core wire (inner conductor) of the coaxial cable is connected to the first power feeding part 31, and the outer conductor of the coaxial cable is connected to ground such as the vehicle body or a metal part that is conductively connected to the vehicle body (vehicle-body ground). The metal part conductively connected to the vehicle body may be, for example, the reinforcement 14. Also, a connector may be used for connecting the amplifier to the first power feeding part 31, and the connector is mounted on the first power feeding part 31. Note that the amplifier may be mounted on the connector.

For example, the first power feeding part 31 is positioned at a location along the first antenna conductor 30A that is closest to the reinforcement 14 in plan view of the rear glass 15. This enables to connect the ground of the power feeder cable or amplifier electrically connected to the first power feeding part 31, to the reinforcement 14 serving as the vehicle-body ground by a relatively short distance, and thereby, enables to reduce noise.

The first antenna element 32 has a first proximity part 33 extending along the lower edge 22 and having a spacing D1 of 3 mm to 60 mm from the lower edge 22 (one example of a first outer edge among the upper, lower, left, and right outer edges of the defogger). Also, in the example illustrated in FIG. 2, the first antenna element 32 is positioned on the lower side with respect to the lower edge 22 where the reinforcement 14 is not present in plan view of the rear glass 15. Note that the lower side corresponds to the ground side of the vehicle when the backdoor 100 is closed.

Here, if the first antenna element 32 is too close to the defogger 20 being a conductor, the antenna gain (AM gain) in an AM broadcast band is likely to decrease. Therefore, a conventional antenna to receive a radio wave in an AM broadcast band has been capable of suppressing the decrease in the AM gain by, for example, extending the total length of the first antenna element 32. Also, if the first antenna element 32 is too close to the reinforcement 14 being a conductor, the AM gain is also likely to decrease. Therefore, a conventional antenna to receive a radio wave in an AM broadcast band has been capable of suppressing the decrease in the AM gain by, for example, lengthening the total length of the first antenna element 32. Also, in order to improve the AM gain of an antenna element receiving radio waves in an AM broadcast band, it has been known that increasing the total length of the antenna element (e.g., the area S1, which will be described later) is effective. However, if marginal regions other than the defogger 20 are relatively narrow, it may be difficult to extend the total length of the first antenna element 32 to a length necessary to suppress the decrease in the AM gain.

In contrast, in the techniques in the present disclosure, the spacing D1 of 3 mm to 60 mm is provided; therefore, the first antenna element 32 can be comparatively separated from the defogger 20. Also, the first antenna element 32 is positioned on the lower side with respect to the lower edge 22 where the reinforcement 14 is not present in plan view of the rear glass 15; therefore, the first antenna element 32 can be comparatively separated from the reinforcement 14. Therefore, even if the total length L1 of the first antenna element 32 is relatively short (a length of longer than or equal to 100 mm and shorter than or equal to 1800 mm), it is possible to suppress the decrease in the AM gain, and to secure a relatively high AM gain. This total length L1 of shorter than or equal to 1800 mm is sufficiently shorter than the sum (2860 mm) of the lengths of the individual wires disclosed in FIG. 3 of Patent Document 1, which is particularly advantageous in arranging an antenna conductor capable of receiving radio waves in an AM broadcast band in a relatively narrow marginal region around a defogger. In this way, the techniques in the present disclosure enable to easily realize both securing of the arrangement region of the first antenna conductor 30A and securing of a predetermined reception sensitivity in an AM broadcast band.

If the total length L1 of the first antenna element 32 is shorter than 100 mm, it is difficult to secure the reception sensitivity in an AM broadcast band. On the other hand, if the total length L1 exceeds 1800 mm, it is difficult to secure the arrangement region of the first antenna conductor 30A. From the viewpoint of securing the reception sensitivity in an AM broadcast band, the total length L1 is favorably longer than or equal to 150 mm, more favorably longer than or equal to 200 mm, more favorably longer than or equal to 300 mm, more favorably longer than or equal to 400 mm, and more favorably longer than or equal to 800 mm. Also, from the viewpoint of securing the arrangement region of the first antenna conductor 30A, the total length L1 is favorably shorter than or equal to 1700 mm, and more favorably shorter than or equal to 1600 mm.

From the viewpoint of realizing both securing of the arrangement region of the first antenna conductor 30A and securing of the reception sensitivity in an AM broadcast band, as described above, the spacing D1 is favorably longer than or equal to 3 mm and shorter than or equal to 60 mm. If the spacing D1 is shorter than 3 mm, it is difficult to secure the reception sensitivity in an AM broadcast band. On the other hand, if the spacing D1 exceeds 60 mm, it is difficult to secure the arrangement region of the first antenna conductor 30A. From the viewpoint of securing the reception sensitivity in an AM broadcast band, the spacing D1 is favorably longer than or equal to 10 mm, more favorably longer than or equal to 20 mm, and more favorably longer than or equal to 30 mm. Also, from the viewpoint of securing the arrangement region of the first antenna conductor 30A, the spacing D1 is favorably shorter than or equal to 50 mm, and more favorably shorter than or equal to 40 mm.

The first antenna element 32 is favorably arranged so as not to overlap the reinforcement 14 in plan view of the rear glass 15. This enables to comparatively separate the first antenna element 32 from the reinforcement 14; therefore, it is possible to suppress the decrease in the AM gain. In particular, from the viewpoint of suppressing the decrease in the AM gain, the first antenna conductor 30A (i.e., the first power feeding part 31 and the first antenna element 32) is favorably arranged so as not to overlap the reinforcement 14 in plan view of the rear glass 15.

In FIG. 2, if a length A1 of the first proximity part 33 that extends along the lower edge 22 and having a spacing D1 of 3 mm to 60 mm from the lower edge 22, is longer than or equal to 100 mm, a higher AM gain can be secured as compared to the case of A1 being shorter than 100 mm. In the example illustrated in FIG. 2, the first antenna element 32 is a linear element arranged only in one peripheral region 42; therefore, the length A1 is equal to the total length L1. Note that the length A1 is favorably shorter than or equal to 800 mm.

Also, in the example illustrated in FIG. 2, as described above, the first antenna element 32 can be comparatively separated from the defogger 20 and the reinforcement 14. Therefore, even if the antenna capacitance Cl of the first antenna element 32 with respect to the vehicle-body ground is a relatively small value (5 pF to 30 pF), it is possible to secure a relatively high AM gain. The antenna capacitance Cl represents a capacity between the vehicle-body ground and the first antenna element 32. If the antenna capacitance required to secure the AM gain becomes smaller, it is possible to secure the required AM gain with a shorter antenna conductor. If the antenna capacitance Cl is less than 5 pF, it is difficult to secure the reception sensitivity in an AM broadcast band. On the other hand, if the antenna capacitance Cl exceeds 30 pF, the area of the first antenna element 32 (e.g., the area S1, which will be described later) becomes larger; therefore, it is difficult to secure the arrangement region of the first antenna conductor 30A.

Also, in the example illustrated in FIG. 2, the first antenna element 32 can be comparatively separated from the defogger 20 and the reinforcement 14; therefore, even if the area S1 of the linear first antenna element 32 is set in a relatively narrow range of 0.0001 $m^2$ to 0.001 $m^2$, it is possible to secure a predetermined AM gain. The area S1 is expressed as a product of the line width and the line length. If the area S1 is less than 0.0001 $m^2$, it is difficult to secure the reception sensitivity in an AM broadcast band. If the area S1 exceeds 0.001 $m^2$, it is difficult to secure the arrangement region of the first antenna conductor 30A. Note that from the viewpoint of securing the reception sensitivity in an AM broadcast band, the area S1 is favorably greater than or equal to 0.00015 $m^2$, more favorably greater than or equal to 0.0002 $m^2$, more favorably greater than or equal to 0.0003 $m^2$, more favorably greater than or equal to 0.0004 $m^2$, and more favorably greater than or equal to 0.0008 $m^2$. Also, from the viewpoint of securing the arrangement region of the first antenna conductor 30A, the area S1 is favorably less than or equal to 0.00095 $m^2$, and more favorably less than or equal to 0.0009 $m^2$.

In the case where the rear glass 15 is a laminated glass, and the elements such as the first antenna element 32 are formal wires enclosed in the rear glass 15, the line width W of the elements such as the first antenna element 32 may be 0.03 mm to 1 mm. If the line width W is less than 0.03 mm, the wire may be broken during manufacturing. Also, if the line width W exceeds 1 mm, a problem such as poor appearance may occur.

Alternatively, in the case where the elements such as the first antenna element 32 are printed wires, the line width W may be 0.2 mm to 50 mm. If the line width W is less than 0.2 mm, the wire may be broken during manufacturing. Also, if the line width W exceeds 50 mm, a problem such as poor appearance and/or manufacturing defects may occur.

Figure 3:
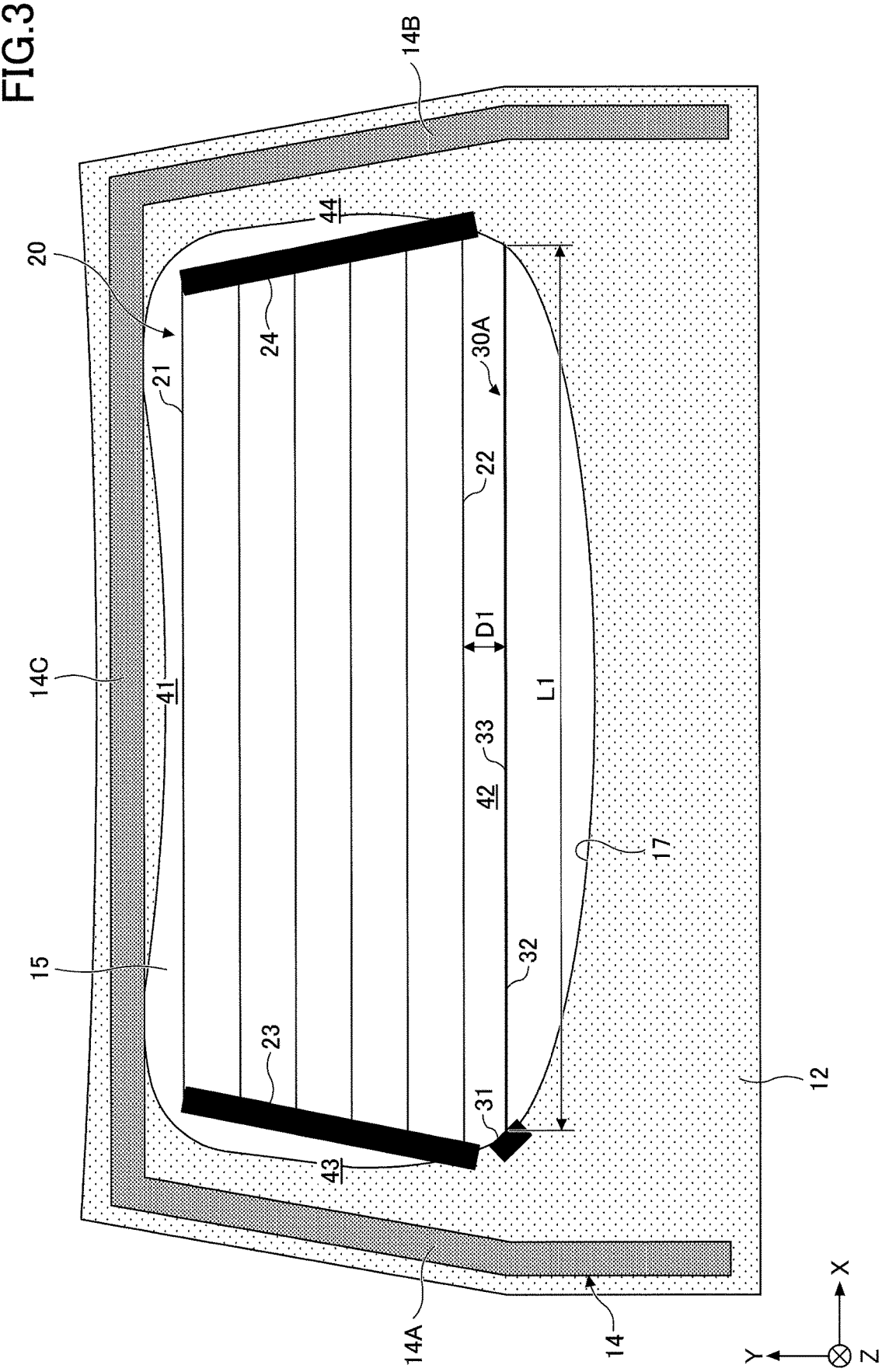
FIG. 3 is a plan view schematically illustrating a second configuration example of a backdoor.

FIG. 3 is a plan view illustrating a second configuration example of a backdoor from which an inner panel 13 is removed, as viewed from the interior side of the vehicle. Description of similar elements and effects as in the configuration example described above will be omitted or simplified by quoting the above description herein. FIG. 3 illustrates a reinforcement 14 having a U-shape, and in this regard, differs from the configuration in FIG. 2.

In FIG. 3, the reinforcement 14 has an upper reinforcement part 14C that connects the upper end of a left reinforcement part 14A with the upper end of a right reinforcement part 14B. The upper reinforcement part 14C extends in an upper region with respect to an opening covered by a rear glass 15 in the lateral direction (horizontal direction). In this second configuration example, it is also possible to secure both the arrangement region of the first antenna conductor 30A and the reception sensitivity in an AM broadcast band.

Figure 4:
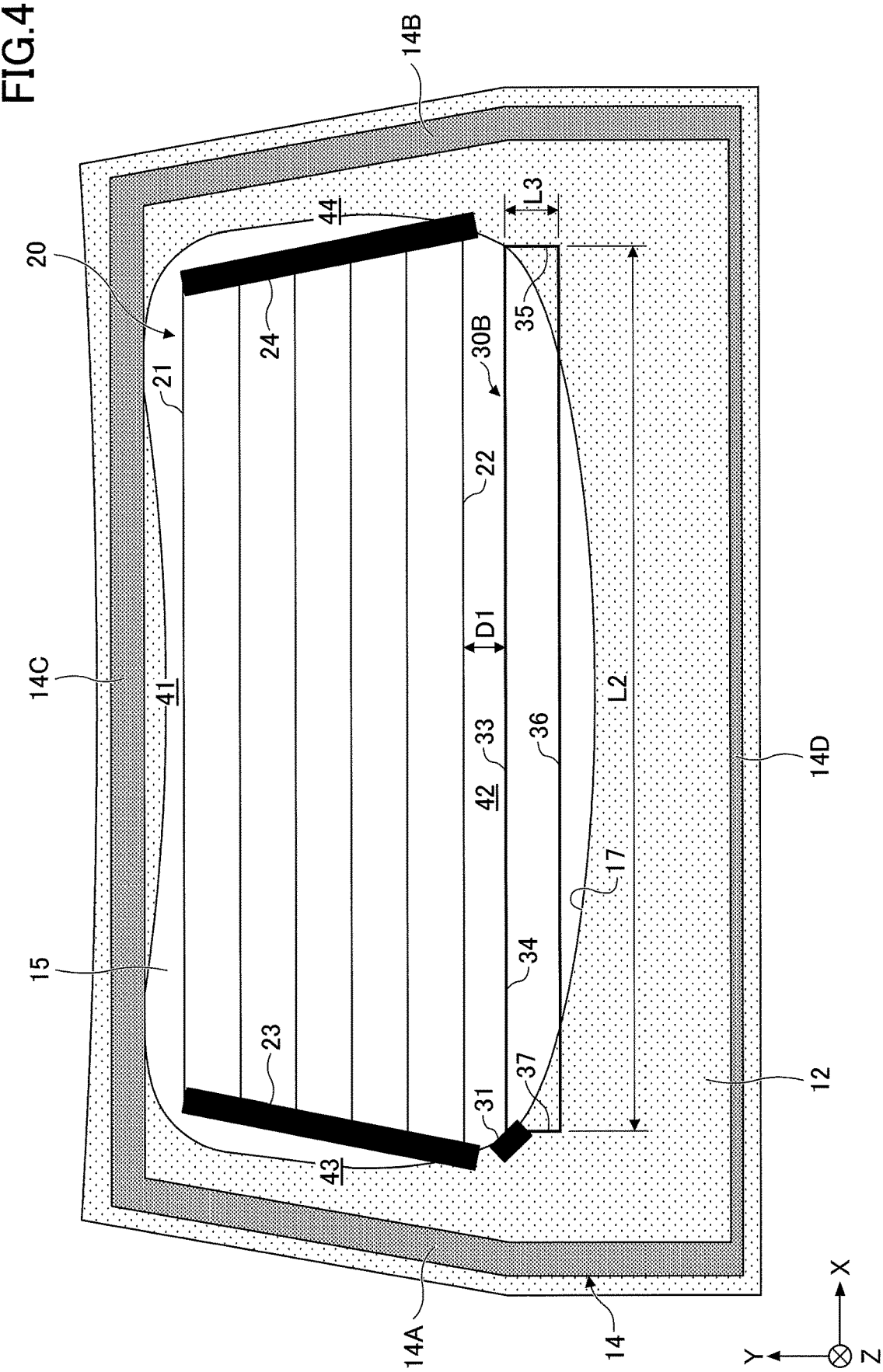
FIG. 4 is a plan view schematically illustrating a third configuration example of a backdoor.

FIG. 4 is a plan view schematically illustrating a third configuration example of a backdoor from which an inner panel 13 is removed, as viewed from the interior side of the vehicle. Description of similar elements and effects as in the configuration examples described above will be omitted or simplified by quoting the above description herein. FIG. 4 illustrates a frame-shaped reinforcement and a loop-shaped first antenna conductor, and in these regards, differs from the above configurations.

In FIG. 4, a reinforcement 14 has a lower reinforcement part 14D that connects the lower end of a left reinforcement part 14A with the lower end of a right reinforcement part 14B. The lower reinforcement part 14D extends in a lower region with respect to an opening covered by a rear glass 15 in the lateral direction (horizontal direction).

In FIG. 4, a first antenna conductor 30B corresponds to a modified example of the first antenna conductor 30 illustrated in FIG. 1. The first antenna conductor 30B is arranged only in a peripheral region 42 located lower than a lower edge 22, among four peripheral regions 41 to 44. The first antenna conductor 30B has a first power feeding part 31 and loop-shaped first antenna elements 34 to 37 having a total length of 100 mm to 1800 mm connected to the first power feeding part 31. In the case of such loop-shaped elements, the total length is equal to the circumference of the loop; in the example illustrated in FIG. 4, the loop shape is rectangular, and hence, the total length is equal to "2×L2+2×L3".

The first antenna elements 34 to 37 have a first proximity part 33 extending along a lower edge 22 and having a spacing D1 of 3 mm to 60 mm from the lower edge 22 (one example of a first outer edge among the upper, lower, left, and right outer edges of the defogger). Also, in the example illustrated in FIG. 4, the first antenna elements 34 to 37 are positioned to be separated from the lower reinforcement part 14D of the reinforcement 14 by longer than or equal to 10 mm. Note that the distance from the first antenna elements 34 to 37 (in this case, the element 36 as a part) to the lower reinforcement part 14D may be set to be longer than or equal to 10 mm in consideration of the distance in the Z-axis direction in FIG. 4. Also, in the other configurations, which will be described later, the distance between the (first) antenna conductor and the reinforcement is also set in consideration of the distance in the Z-axis direction.

According to the configuration in FIG. 4, a spacing D1 of 3 mm to 60 mm is provided; therefore, the first antenna elements 34 to 37 can be comparatively separated from the defogger 20. Also, the first antenna elements 34 to 37 are positioned to be separated from the lower reinforcement part 14D of the reinforcement 14 by longer than or equal to 10 mm; therefore, the first antenna elements 34 to 37 can be comparatively separated from the reinforcement 14. Therefore, even if the total length (circumference) of the first antenna elements 34 to 37 is relatively short (a length of longer than or equal to 100 mm and shorter than or equal to 1800 mm), it is possible to suppress the decrease in the AM gain, and to secure a predetermined AM gain. Therefore, the configuration in FIG. 4 enables to easily realize both securing of the arrangement region of the first antenna conductor 30B and securing of a predetermined reception sensitivity in an AM broadcast band.

Note that the loop-shaped element may have a disconnected portion in the "loop". The length of the disconnected portion may be included in the circumference of the loop. Also, the number of disconnected portions is favorably less than or equal to two, and more favorably one, from the viewpoint of securing a predetermined reception sensitivity in an AM broadcast band. The width of a disconnected portion (disconnection width) is favorably shorter than or equal to 10 mm, and more favorably shorter than or equal to 5 mm, from the viewpoint of securing a predetermined reception sensitivity in an AM broadcast band.

In FIG. 4, if a length A1 of the first proximity part 33 that extends along the lower edge 22 and having a spacing D1 of 3 mm to 60 mm from the lower edge 22, is longer than or equal to 100 mm, a higher AM gain can be secured as compared to the case of A1 being shorter than 100 mm. In the example illustrated in FIG. 4, the first antenna elements 34 to 37 constitute a loop-shaped element arranged only in one peripheral region 42; therefore, the length A1 is equal to the line length L2 of the linear element part 34.

Also, the first antenna elements 34 to 37 can be comparatively separated from the defogger 20 and the reinforcement 14; therefore, even if the area S2 surrounded by the loop of the loop-shaped first antenna elements 34 to 37 is set within a relatively narrow range of 0.01 $m^2$ to 0.05 $m^2$, it is possible to secure a predetermined AM gain. The area S2 is expressed as the inner area surrounded by the loop (L2×L3 in the case of a rectangular loop illustrated in FIG. 4). If the area S2 is less than 0.01 $m^2$, it is difficult to secure the reception sensitivity in an AM broadcast band. On the other hand, if the area S2 exceeds 0.05 $m^2$, it is difficult to secure the arrangement region of the first antenna conductor 30B. Also, from the viewpoint of securing the reception sensitivity in an AM broadcast band, the area S2 is favorably greater than or equal to 0.012 $m^2$, and more favorably greater than or equal to 0.024 $m^2$.

Note that in the case of having a disconnected portion as a part of the "loop" as described above, the area S2 of the loop-shaped element is defined with a loop shape assuming that there is no disconnected portion.

The shape of the loop-shaped first antenna elements 34 to 37 is a rectangle having a long side (in this case, the element 34 or 36) along the horizontal direction in which the lower edge 22 of the defogger 20 extends. If the length of a short side of the rectangle (in this case, the element 35 or 37) is shorter than or equal to 80 mm, it is advantageous in realizing both securing of the arrangement area of the first antenna conductor 30B and securing of the reception sensitivity in an AM broadcast band. Also, if the length of a long side of the rectangle is shorter than or equal to ¾ of the length of the lower edge 22 of the defogger 20, it is advantageous in securing of the arrangement area of the first antenna conductor 30B.

Also, if the distance between the lower edge 22 and the element 34 (e.g., spacing D1) is 3 mm to 30 mm, and the length of the short sides of the rectangle is 3 mm to 50 mm, the first antenna conductor 30B can receive radio waves in both frequency bands of AM broadcast waves and of FM broadcast waves. In other words, in the above configuration, it is possible to make the first antenna conductor 30B serve as a shared antenna capable of receiving AM broadcast waves and FM broadcast waves.

Figure 5:
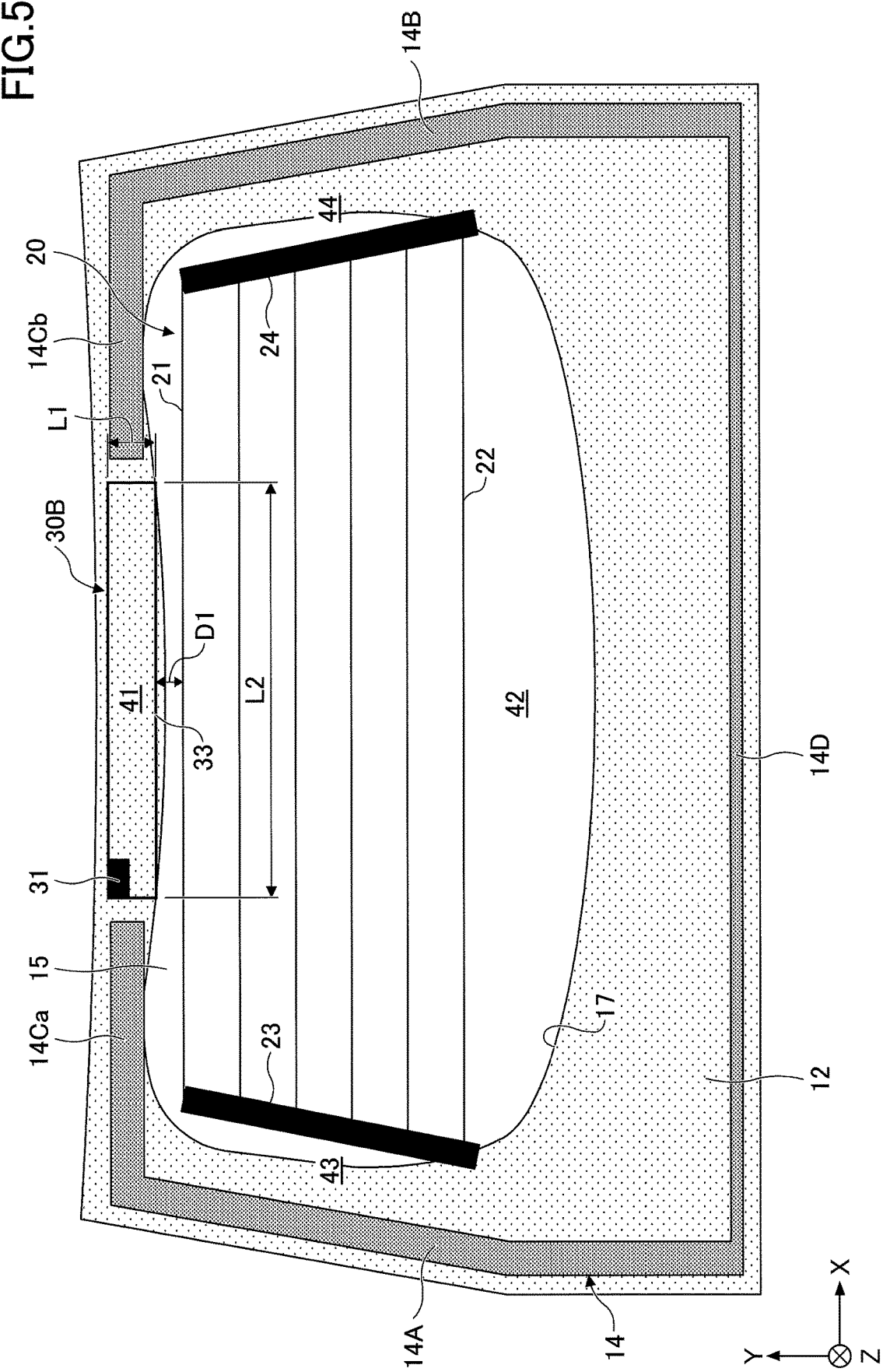
FIG. 5 is a plan view schematically illustrating a fourth configuration example of a backdoor.

FIG. 5 is a plan view schematically illustrating a fourth configuration example of a backdoor from which an inner panel 13 is removed, as viewed from the interior side of the vehicle. Description of similar elements and effects as in the configuration examples described above will be omitted or simplified by quoting the above description herein. FIG. 5 illustrates a first antenna conductor 30B present in a marginal region between an upper-left reinforcement part 14Ca and an upper-right reinforcement part 14Cb, and in this regard, differs from the configurations described above.

The loop-shaped element of the first antenna conductor 30B is positioned to be separated from the reinforcement 14 by longer than or equal to 10 mm, or positioned on the upper side of the upper edge 21 of the defogger 20 where the reinforcement 14 is not present in plan view of the rear glass 15. The loop-shaped element of the first antenna conductor 30B is arranged only in the peripheral region 41 located higher than the upper edge 21, among the four peripheral regions 41 to 44.

The loop-shaped element has a first proximity part 33 extending along the upper edge 21 and having a spacing D1 of 3 mm to 60 mm from the upper edge 21 (one example of a first outer edge among the upper, lower, left, and right outer edges of the defogger). Also, in the example illustrated in FIG. 5, the loop-shaped element is positioned on the upper side with respect to the upper edge 21 where the reinforcement 14 is not present in plan view of the rear glass 15.

Therefore, according to the configuration in FIG. 5, as in the configuration in FIG. 4, it is possible to easily realize both securing of the arrangement region of the first antenna conductor 30B and securing of the reception sensitivity in an AM broadcast band.

TABLE 1

| [dB μ V] | (a) | (b) | (c) | (d) | (e) | (f) |
|---|---|---|---|---|---|---|
| AM gain | 43.0 | 40.0 | 38.0 | 45.0 | 45.0 | 40.0 |

Figure 6A:
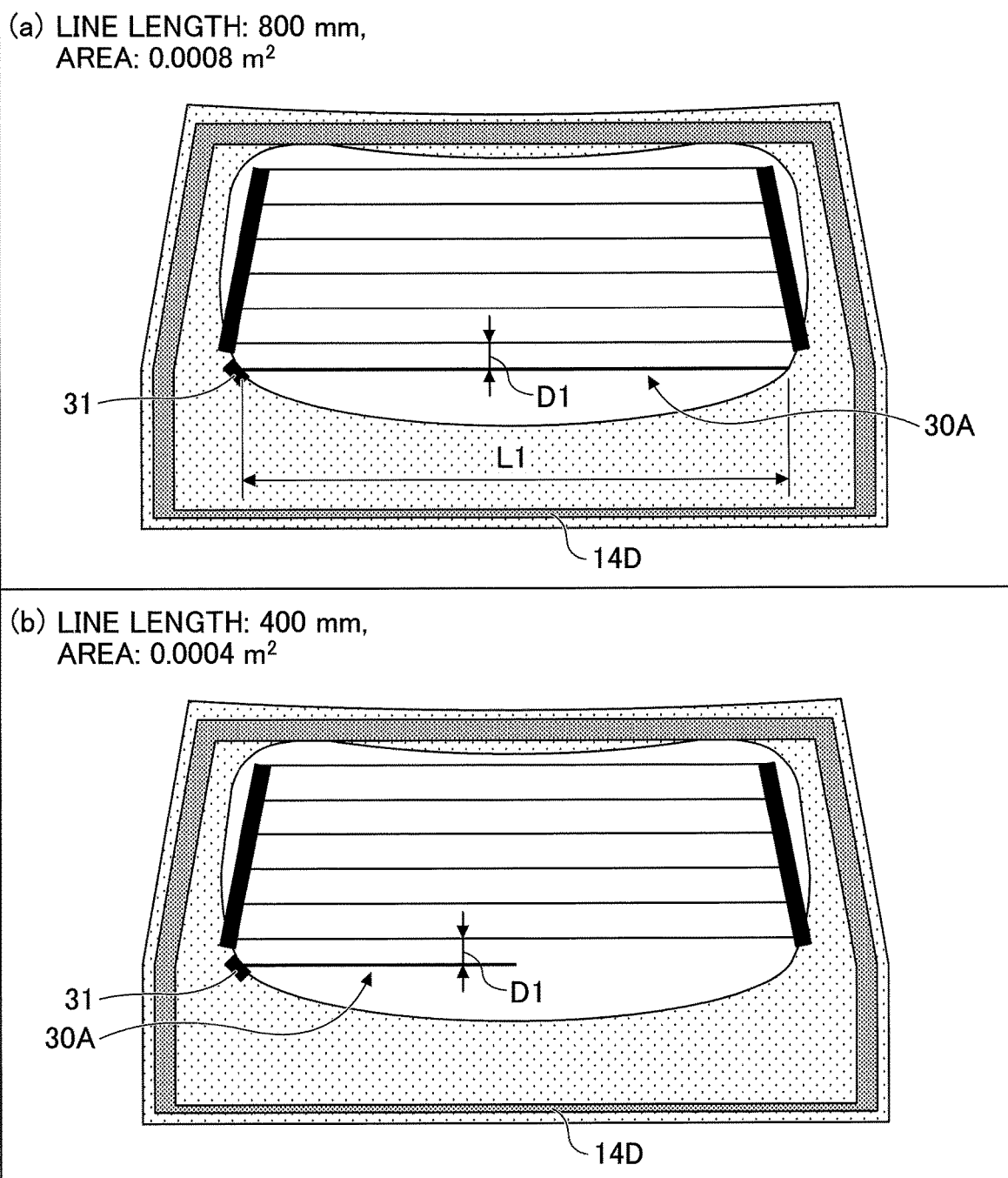
FIG. 6A is a plan view schematically illustrating configuration examples of antenna conductors.

Table 1 shows an example of measurement results of the AM gain obtained for configuration examples illustrated in FIGS. 6A, 6B, and 6C. In Table 1, (a): (a) in FIG. 6A (total length L1: 800 mm, and area S1: 0.0008 m$^2$);

(b): (b) in FIG. 6A (total length L1: 400 mm, and area S1: 0.0004 m$^2$);

(c): (c) in FIG. 6B (total length L1: 1600 mm, and area S1: 0.0016 m$^2$);

(d): (d) in FIG. 6B (total length L1: 1600 mm, and area S1: 0.0016 m$^2$);

(e): (e) in FIG. 6C (area shaded by diagonal lines representing the arrangement region of the antenna: 0.105 m$^2$); and (f): (f) in FIG. 6C (area shaded by diagonal lines representing the arrangement region of the antenna: 0.06 m$^2$), are assumed. Note that the line width of each element is 1 mm in any case in FIGS. 6A and 6B. Also, D1 is 30 mm in any case in FIGS. 6A and 6B. Also, in FIG. 6A and in (d) in FIG. 6B, the distance between the first antenna conductor 30A or 30D and the lower reinforcement part 14D is 200 mm. In FIG. 6B, the distance between the first antenna conductor 30C or 30D and the left reinforcement part 14A, and the distance between the first antenna conductor 30C or 30D and the right reinforcement part 14B are 10 mm to 20 mm. Further, in (c) in FIG. 6B, the distance between the first antenna conductor 30C and the upper reinforcement part 14C is 10 mm to 20 mm.

The first antenna conductor 30C in (c) in FIG. 6B is arranged in three (left, upper, and right) peripheral regions, among the four (upper, lower, left, and right) peripheral regions of the defogger. The first antenna conductor 30D in (d) in FIG. 6B is arranged in three (left, upper, and right) peripheral regions, among the four (upper, lower, left, and right) peripheral regions of the defogger. The antenna conductor 131 in (e) in FIG. 6C is an antenna for an AM band having a total length exceeding 1800 mm (comparative example). The antenna conductor 132 in (f) in FIG. 6C is an antenna for the AM band having a total length exceeding 1800 mm (comparative example).

According to Table 1, (a) to (d) can secure antenna gains comparable to those of (e) and (f) even if the total length of the antenna conductor is shorter than in (e) and (f) (even if the area is smaller).

TABLE 2

| [dB μ V] | (g) | (h) | (i) | (f) |
|---|---|---|---|---|
| AM gain | 40.0 | 36.0 | 39.5 | 40.0 |

Table 2 shows an example of measurement results of the AM gain obtained for configuration examples illustrated in FIGS. 7A and 7B. In (g) and (h) in FIG. 7A, the reinforcement is separated laterally in the upper reinforcement part, and in this regard, differs from (a) and (b) in FIG. 6A. In (i) in FIG. 7B, the reinforcement is separated laterally in the upper reinforcement part, and in this regard, differs from (c) in FIG. 6B.

Note that the line width of each element is 1 mm in any case in FIGS. 7A and 7B. Also, D1 is 30 mm in any case in FIGS. 7A and 7B. Also, in FIG. 7A, the distance between the first antenna conductor 30A and the left reinforcement part 14A is 10 mm to 20 mm. In FIG. 7B, the distance between the first antenna conductor 30C and the left reinforcement part 14A, and the distance between the first antenna conductor 30C and the right reinforcement part 14B are 10 mm to 20 mm. Further, in (i) in FIG. 7B, the distance between the first antenna conductor 30C and the upper-left reinforcement part and the upper-right reinforcement part is also 10 mm to 20 mm.

According to Table 2, (g) through (i) in which the reinforcement is separated can secure antenna gains comparable to those of (a) to (c) in which the reinforcement is not separated. Also, (g) to (i) can secure antenna gains comparable to that of (f) even if the total length of the antenna conductor is shorter than that in (f) (even if the area is smaller).

TABLE 3

| [dB μ V] | L1 (S1) | | | | | |
|---|---|---|---|---|---|---|
| | 800 mm (0.0008 m²) | 400 mm (0.0004 m²) | 300 mm (0.0003 m²) | 200 mm (0.0002 m²) | 150 mm (0.00015 m²) | 100 mm (0.0001 m²) |
| AM gain | 43.0 | 40.0 | 39.0 | 38.0 | 36.5 | 35.5 |

Table 3 shows an example of measurement results of the AM gain when the total length L1 of the first antenna conductor 30A is varied in the form illustrated in FIG. 6A. According to Table 3, the AM gain increases more as the total length L1 becomes longer, and when the total length L1 is longer than or equal to 100 mm, it is possible to secure the reception sensitivity in the AM broadcast band. Note that the line width of each element is 1 mm in FIG. 6A. Also, D1 is 30 mm both in FIG. 6A. Also, in FIG. 6A, the distance between the first antenna conductor 30A and the lower reinforcement part 14D is 200 mm.

TABLE 4

| [dB μ V] | (a) | (b) | (c) | (d) | (e) |
|---|---|---|---|---|---|
| AM gain | 43.0 | 42.0 | 45.0 | 44.0 | 47.0 |

Table 4 shows an example of measurement results of the AM gain when the total length and area of the linear first antenna conductor 30A and the loop-shaped first antenna conductor 30B were varied. In Table 4,
(a): FIG. 6A (total length L1: 800 mm, and area S1: 0.0008 m²);
(b): FIG. 4 (line length L2: 400 mm, line length L3: 30 mm, area S2: 0.012 m²);
(c): FIG. 4 (line length L2: 800 mm, line length L3: 30 mm, area S2: 0.024 m²);
(d): FIG. 4 (line length L2: 400 mm, line length L3: 60 mm, area S2: 0.024 m²); and
(e): FIG. 4 (line length L2: 800 mm, line length L3: 60 mm, area S2: 0.048 m²),
are assumed. According to Table 4, a larger area of the first antenna conductor and a longer line length L2 improve the AM gain to be higher. Note that the line width of each element in FIG. 6A is 1 mm. Also, D1 is 30 mm in any case in FIGS. 6A and 4. Also, in FIGS. 6A and 4, the distance between the first antenna conductor 30A or 30B and the lower reinforcement part 14D is 200 mm.

TABLE 5

| [dB μ V] | | | D1 | | |
|---|---|---|---|---|---|
| | | | 30 mm | 15 mm | 10 mm |
| AM gain | L1 (S1) | 800 mm (0.0008 m²) | 43.0 | 40.0 | 38.5 |
| | | 400 mm (0.0004 m²) | 40.0 | 37.5 | 36.0 |
| | | 200 mm (0.0002 m²) | 38.0 | 36.0 | 35.0 |

Table 5 shows an example of measurement results of the AM gain when the spacing D1 between the defogger and the first antenna conductor 30A was changed to 30 mm, 15 mm, and 10 mm in the three types of forms illustrated in FIG. 6A having different total lengths and areas. In Table 5, the line length L1 represents the length of the first proximity part 33 extending along the defogger, and the area S1 represents the area of the first antenna conductor 30A. A longer spacing D1 and a longer length of the first proximity part 33 extending along the defogger improve the AM gain to be higher. Note that the line width of each element is 1 mm for either case in FIG. 6A. Also, in FIG. 6A, the distance between the first antenna conductor 30A and the lower reinforcement part 14D is 200 mm.

TABLE 6

| [dB μ V] | (a) | (b) | (c) | (d) |
|---|---|---|---|---|
| AM gain | 43.0 | 44.0 | 44.0 | 38.0 |

Table 6 shows an example of measurement results of the AM gain obtained for configuration examples illustrated in FIGS. 8A and 8B. In Table 6,
(a): (a) in FIG. 8A (total length L1: 800 mm, and area S1: 0.0008 m²);
(b): (b) in FIG. 8A (total length L1: 1200 mm, and area S1: 0.0012 m²);
(c): (c) in FIG. 8B (total length L1: 1200 mm, and area S1: 0.0012 m²); and
(d): (d) in FIG. 8B (total length L1: 1600 mm, and area S1: 0.0016 m²),
are assumed. Note that the line width of each element is 1 mm in any case in FIGS. 8A and 8B. Also, D1 is 30 mm in any case in FIGS. 8A and 8B. Also, in FIG. 8A and in (c) in FIG. 8B, the distance between each of the first antenna conductors 30A, 30E, and 30F and the lower reinforcement part 14D is 200 mm. In FIGS. 8A and 8B, the distance between a second proximity part 39 and the right reinforcement part 14B, and the distance between the second proximity part 39 and the left reinforcement part 14A are 10 mm to 20 mm. Further, in (d) in FIG. 8B, the distance between the first proximity part 33 and the upper reinforcement part is also 10 mm to 20 mm.

The first antenna conductor 30A illustrated in (a) in FIG. 8A is arranged only in one peripheral region on the lower side, among the four (upper, lower, left, and right) peripheral regions of the defogger. The first antenna conductor 30E illustrated in (b) in FIG. 8A is arranged only in two peripheral regions adjacent to each other on the lower and right sides, among the four (upper, lower, left, and right) peripheral regions of the defogger. The first antenna conductor 30F illustrated in (c) in FIG. 8B is arranged only in two peripheral regions adjacent to each other on the left and lower sides, among the four (upper, lower, left, and right) peripheral regions of the defogger. The first antenna conductor 30C illustrated in (d) in FIG. 8B is arranged only in three peripheral regions on the left, upper, and right sides, among the four (upper, lower, left, and right) peripheral regions of the defogger.

The first antenna conductor 30E in (b) in FIG. 8A has a first power feeding part 31 and an L-shaped first antenna element 32 connected to the first power feeding part 31. The first antenna element 32 has a first proximity part 33 extending along the lower edge 22 and having a spacing of 3 mm to 60 mm from the lower edge 22 of the defogger 20, and a second proximity part 39 extending along the right edge 24 and having a spacing of 10 mm to 40 mm from the right edge 24 of the defogger 20. In the first antenna conductor 30E, the first proximity part 33 is arranged in a region located lower than the defogger 20, and the second proximity part 39 is arranged in a region located further right than the defogger 20. The right edge 24 is an example of a second outer edge connected to a first outer edge among the upper, lower, left, and right outer edges of the defogger.

The first antenna conductor 30F in (c) in FIG. 8B has a first power feeding part 31 and an L-shaped first antenna element 32 connected to the first power feeding part 31. The first antenna element 32 has a first proximity part 33 extending along the lower edge 22 and having a spacing of 3 mm to 60 mm from the lower edge 22 of the defogger 20, and a second proximity part 39 extending along the left edge 23 and having a spacing of 10 mm to 40 mm from the left edge 23 of the defogger 20. In the first antenna conductor 30F, the first proximity part 33 is arranged in a region located lower than the defogger 20, and the second proximity part 39 is arranged in a region located further left than the defogger 20. The left edge 23 is an example of a second outer edge connected to a first outer edge among the upper, lower, left, and right outer edges of the defogger.

The first antenna conductor 30C in (d) in FIG. 8B has a first power feeding part 31 and a U-shaped first antenna element 32 connected to the first power feeding part 31. The first antenna element 32 has a first proximity part 33 extending along the upper edge 21 and having a spacing of 3 mm to 60 mm from the upper edge 21 of the defogger 20, and a second proximity part 39 extending along the left edge 23 and the right edge 24, and having a spacing of 10 mm to 40 mm from the left edge 23 and the right edge 24 of the defogger 20. In the first antenna conductor 30C, the first proximity part 33 is arranged in a region located higher than the defogger 20, and the second proximity part 39 is arranged in a region located further left and further right than the defogger 20.

According to Table 6, (a) can secure an AM gain comparable to those of (b) and (c) even if (a) has a shorter total length of the antenna conductor (or a smaller area S1) than (b) and (c). Also, (a) to (c) have shorter lengths proximate to the reinforcement compared to (d); therefore, the AM gain is improved.

FIG. 9 is a plan view schematically illustrating a fifth configuration example of a backdoor from which an inner panel 13 is removed, as viewed from the interior side of the vehicle. Description of similar elements and effects as in the configuration examples described above will be omitted or simplified by quoting the above description herein. FIG. 9 illustrates a rear glass 15 further including a second antenna conductor and a T-shaped element, and in these regards, differs from the configurations described above.

The shape and dimensions of a second antenna conductor 50A are formed to be capable of receiving radio waves in a frequency band of FM broadcast waves (e.g., 76 MHz to 95 MHz). The second antenna conductor 50A has a second power feeding part 51 electrically connected to a defogger 20 (e.g., at a bus bar formed at the left edge 23). In the example illustrated in FIG. 9, the second power feeding part 51 is connected to the lower end of the bus bar formed at the left edge 23 of the defogger 20 via a connection element 52. Note that the shape and dimensions of the second antenna conductor 50A may be formed to be capable of receiving radio waves in a frequency band of FM broadcast waves (FM broadcast band) including a frequency band of the U.S. standard, for example, ranging 76 MHz to 108 MHz. Also, as long as being capable of receiving only an FM broadcast band, the second antenna conductor 50A simply needs not to contact the reinforcement, and is favorably separated from the reinforcement by longer than or equal to 1 mm, and more favorably separated from the reinforcement by longer than or equal to 3 mm.

The T-shaped element has a vertical element 53 that vertically crosses multiple electric heating wires extending horizontally in the defogger 20, and a horizontal element 54 extending in the lateral direction (horizontal direction) in a peripheral region 41 located higher than the upper edge 21 of the defogger 20. The vertical element 53 extends from a middle part of the horizontal element 54 toward the lower side, and crosses the multiple electric heating wires in the defogger 20. Also, as long as the second antenna conductor 50A is designed to be capable of receiving only an FM broadcast band, the T-shaped element simply needs not to contact the reinforcement, and is favorably separated from the reinforcement by longer than or equal to 1 mm, and more favorably separated from the reinforcement by longer than or equal to 3 mm.

According to the configuration in FIG. 9, a signal in an AM broadcast band received by the first antenna conductor 30A can be extracted from the first power feeding part 31. Also, a signal of an FM broadcast wave received by the second antenna conductor 50A can be extracted from the second power feeding part 51. Note that in the configuration in FIG. 9, having the T-shaped element 44 improves the reception sensitivity in an FM broadcast band.

TABLE 7

| [dB μ V] | Horizontal polarization | Vertical polarization |
|---|---|---|
| FM gain | 55.7 | 53.2 |
| Frequency characteristic [AVE-MIN] | 2.2 | 4.1 |

Table 7 shows an example of measurement results of the FM gain and the frequency characteristic in the configuration example illustrated in FIG. 9. The FM gain is an average of the antenna gain in an FM broadcast band. A frequency characteristic [AVE-MIN] represents a difference between an average value (AVE) of the FM gain at frequencies from 76 MHz to 108 MHz as an FM broadcast band, and a minimum value (MIN) of the FM gain among the frequencies from 76 MHz to 108 MHz. According to Table 7, it is possible to secure an FM gain and a frequency characteristic required for both horizontal polarization and vertical polarization. Note that the FM gain and the frequency characteristic [AVE-MIN] in tables described later are also based on the frequency band from 76 MHz to 108 MHz.

Note that when the measurement in Table 7 was performed, the dimensions of the parts illustrated in FIG. 9 were set as follows:

the vertical width of the defogger 20: approximately 300 mm;

the lateral width of the defogger 20: approximately 1040 mm;

the pitch between the multiple electric heating wires in the defogger 20: 30 mm;

the length of the horizontal element 54: 600 mm;
the spacing between the horizontal element 54 and the upper edge 21: 50 mm;
the length of the vertical element 53: 350 mm;
the length of the connection element 52: 40 mm;
the length of the bus bars extending along the left edge 23 and the right edge 24 of the defogger 20: 280 mm;
the width of the bus bars extending along the left edge 23 and the right edge 24 of the defogger 20: 10 to 15 mm;
the spacing between the horizontal element 54 and the upper reinforcement part 14C: 45 mm; and
the distance between the second power feeding part 51 and the left reinforcement part 14A: 15 mm.

Figure 10A:
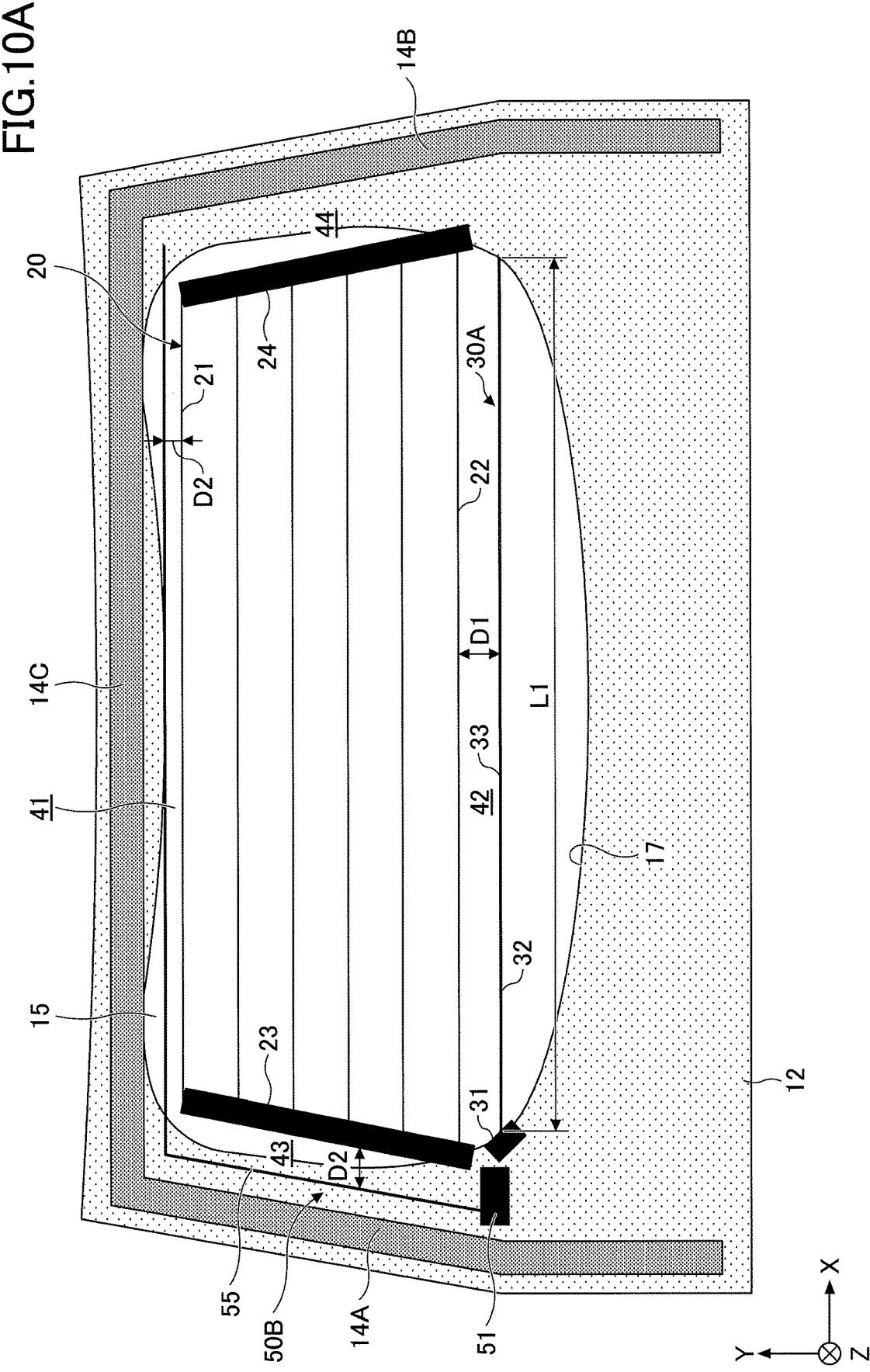
FIG. 10A is a plan view schematically illustrating a sixth configuration example of a backdoor.

FIG. 10A is a plan view schematically illustrating a sixth configuration example of a backdoor from which an inner panel 13 is removed, as viewed from the interior side of the vehicle. Description of similar elements and effects as in the configuration examples described above will be omitted or simplified by quoting the above description herein. FIG. 10A illustrates a rear glass 15 that includes a second antenna conductor 50B, and in this regard, differs from the configurations described above.

The shape and dimensions of the second antenna conductor 50B are formed to be capable of receiving radio waves in an FM broadcast band. The second antenna conductor 50B has a second power feeding part 51 connected or proximate to the defogger 20, and a second antenna element 55 arranged to be separated from the defogger 20 by a spacing D2 of 1 mm to 40 mm. In the example illustrated in FIG. 10A, the second power feeding part 51 is proximate to the lower end of the left edge 23 and the upper edge 21 of the defogger 20, and the second antenna element 55 extends along the left edge 23 and the upper edge 21 having the spacing D2 of 1 mm and 40 mm from each of the left edge 23 of the defogger 20. Also, the second antenna element 55 extends from the second power feeding part 51, through the peripheral region 43 on the left side among the two peripheral regions 43 and 44 on the left and right and outside the defogger 20, to the peripheral region 41 located higher than the upper edge 21 of the defogger 20. Note that as long as being capable of receiving only an FM broadcast band, the second antenna conductor 50B simply needs not to contact the reinforcement, and is favorably separated from the reinforcement by longer than or equal to 1 mm, and more favorably separated from the reinforcement by longer than or equal to 3 mm.

According to the configuration in FIG. 10A, a signal in an AM broadcast band received and obtained by the first antenna conductor 30A can be extracted from the first power feeding part 31. Also, a signal in an FM broadcast band received by the second antenna conductor 50B can be extracted from the second power feeding part 51. In this way, having the second antenna element 55 improves the reception sensitivity in an FM broadcast band.

From the viewpoint of improving the reception sensitivity in an FM broadcast band, the total length of the second antenna element 55 is favorably longer than or equal to 200 mm and shorter than or equal to 1400 mm, and more favorably longer than or equal to 300 mm and shorter than or equal to 1200 mm. Also, from the viewpoint of improving the reception sensitivity of FM broadcast waves, the spacing D2 is favorably longer than 0 mm and shorter than or equal to 40 mm, and more favorably longer than or equal to 3 mm and shorter than or equal to 20 mm.

Figure 10B:
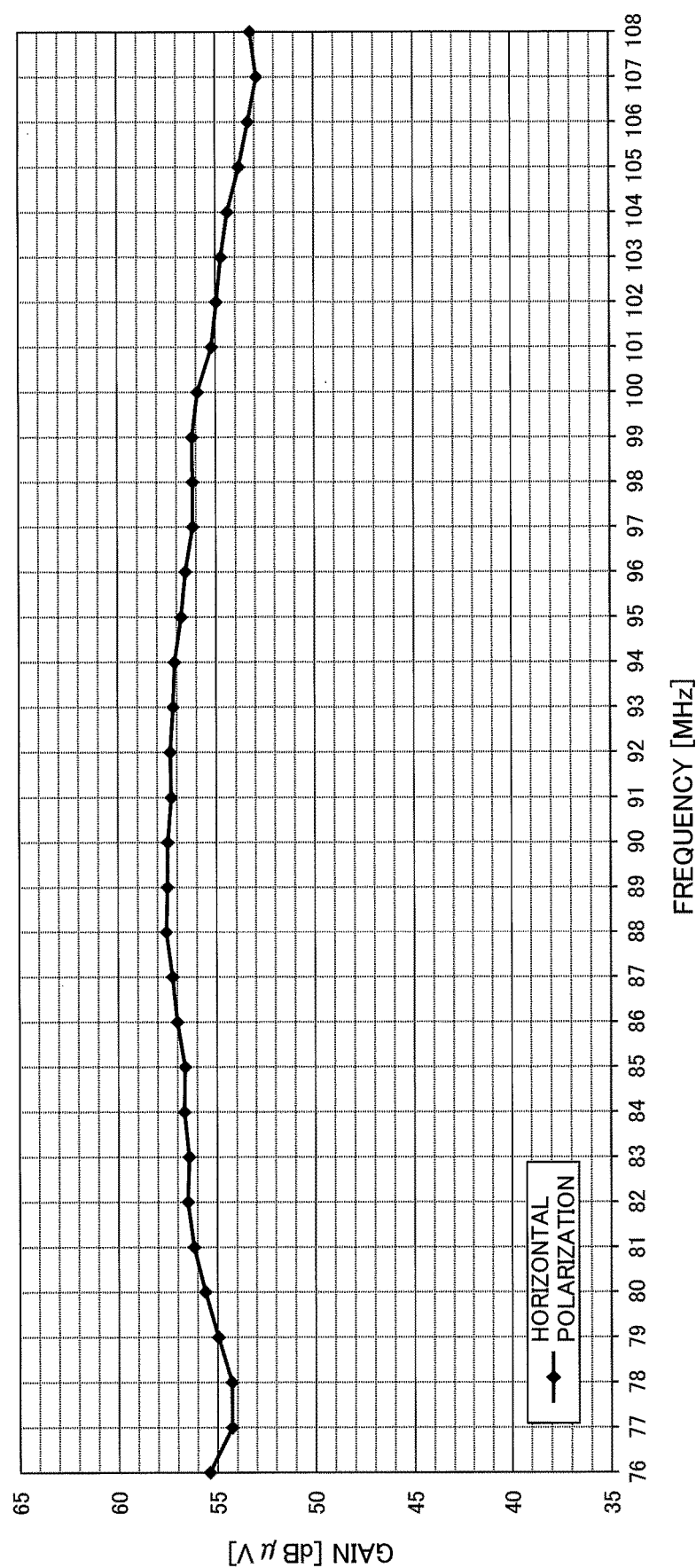
FIG. 10B is a diagram illustrating an example of measurement results of the FM gain with respect to horizontal polarization in a configuration example illustrated in FIG. 10A.
Figure 10C:
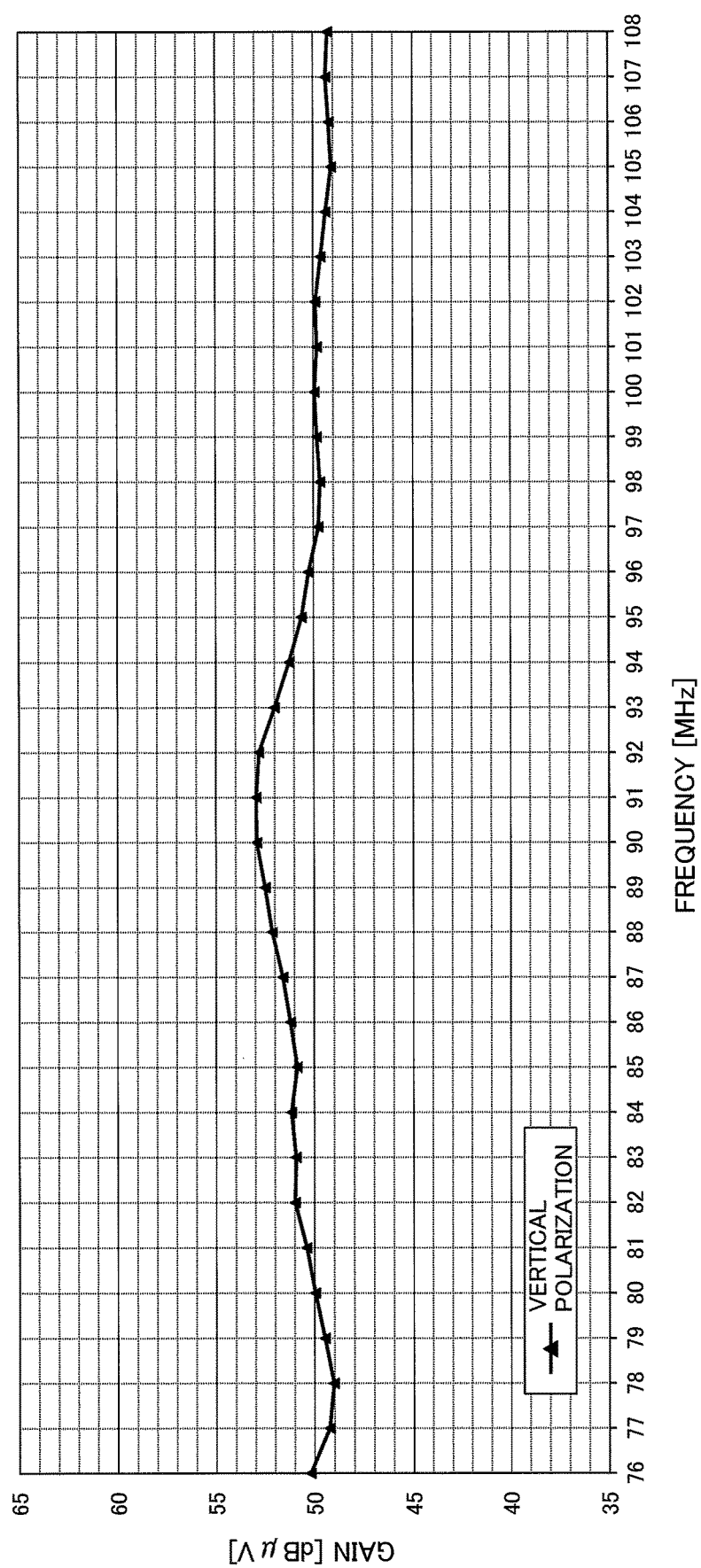
FIG. 10C is a diagram illustrating an example of measurement results of the FM gain with respect to vertical polarization in a configuration example illustrated in FIG. 10A.

FIG. 10B illustrates an example of measurement results of the FM gain at the respective frequencies with respect to horizontal polarization in the configuration example illustrated in FIG. 10A. FIG. 10C illustrates an example of measurement results of the FM gain at the respective frequencies with respect to vertical polarization in the configuration example illustrated in FIG. 10A. According to FIGS. 10B and 10C, it is possible to secure an FM gain and a frequency characteristic that are required. Note that the second antenna conductor 50B was arranged so as to have a distance of 20 mm to 30 mm from the reinforcement. Also, FIGS. 10B and 10C show the case of the total length of the second antenna element 55 being 400 mm, D2 being 3 mm, L1 being 1000 mm, and D1 being 40 mm.

TABLE 8

| [dB μ V] | Length of antenna element 55 | | |
|---|---|---|---|
| | 1000 mm | 700 mm | 400 mm |
| Horizontal polarization | | | |
| FM gain | 50.9 | 53.4 | 56.0 |
| Frequency characteristic [AVE-MIN] | 14.0 | 8.7 | 3.1 |
| Vertical polarization | | | |
| FM gain | 46.4 | 48.5 | 50.6 |
| Frequency characteristic [AVE-MIN] | 7.7 | 4.5 | 1.6 |

Table 8 shows an example of measurement results of the FM gain and the frequency characteristic in the configuration example illustrated in FIG. 10A, when the total length of the second antenna element 55 was changed to 1000 mm, 700 mm, and 400 mm. In this case, the spacing D2 was 3 mm. According to Table 8, it is possible to secure an FM gain and a frequency characteristic required for both horizontal polarization and vertical polarization.

TABLE 9

| [dB μ V] | D2 | | |
|---|---|---|---|
| | 3 mm | 10 mm | 20 mm |
| Horizontal polarization | | | |
| FM gain | 56.0 | 55.3 | 52.9 |
| Frequency characteristic [AVE-MIN] | 3.1 | 4.3 | 5.9 |
| Vertical polarization | | | |
| FM gain | 50.6 | 50.1 | 48.1 |
| Frequency characteristic [AVE-MIN] | 1.6 | 2.7 | 3.5 |

Table 9 shows an example of measurement results of the FM gain and the frequency characteristic in the configuration example illustrated in FIG. 10A, when the spacing D2 was changed to 3 mm, 10 mm, and 20 mm. In this case, the total length of the second antenna element 55 was 400 mm. According to Table 9, it is possible to secure an FM gain and a frequency characteristic required for both horizontal polarization and vertical polarization.

FIG. 11 is a plan view schematically illustrating a seventh configuration example of a backdoor from which an inner panel 13 is removed, as viewed from the interior side of the vehicle. Description of similar elements and effects as in the configuration examples described above will be omitted or simplified by quoting the above description herein. FIG. 11 illustrates a second power feeding part 51 connected to a defogger 20 via a connection element 52, and in this regard, differs from the configuration in FIG. 10A. In the example illustrated in FIG. 11, the second antenna conductor 50C has a second power feeding part 51 connected to the lower end of the left edge 23 of the defogger 20 through the connecting element 52.

According to the configuration in FIG. 11, a signal in an AM broadcast band received and obtained by the first antenna conductor 30A can be extracted from the first power feeding part 31. Also, a signal in an FM broadcast band received by the second antenna conductor 50C can be extracted from the second power feeding part 51. Having the second antenna element 55 improves the reception sensitivity in an FM broadcast band.

Figure 12:
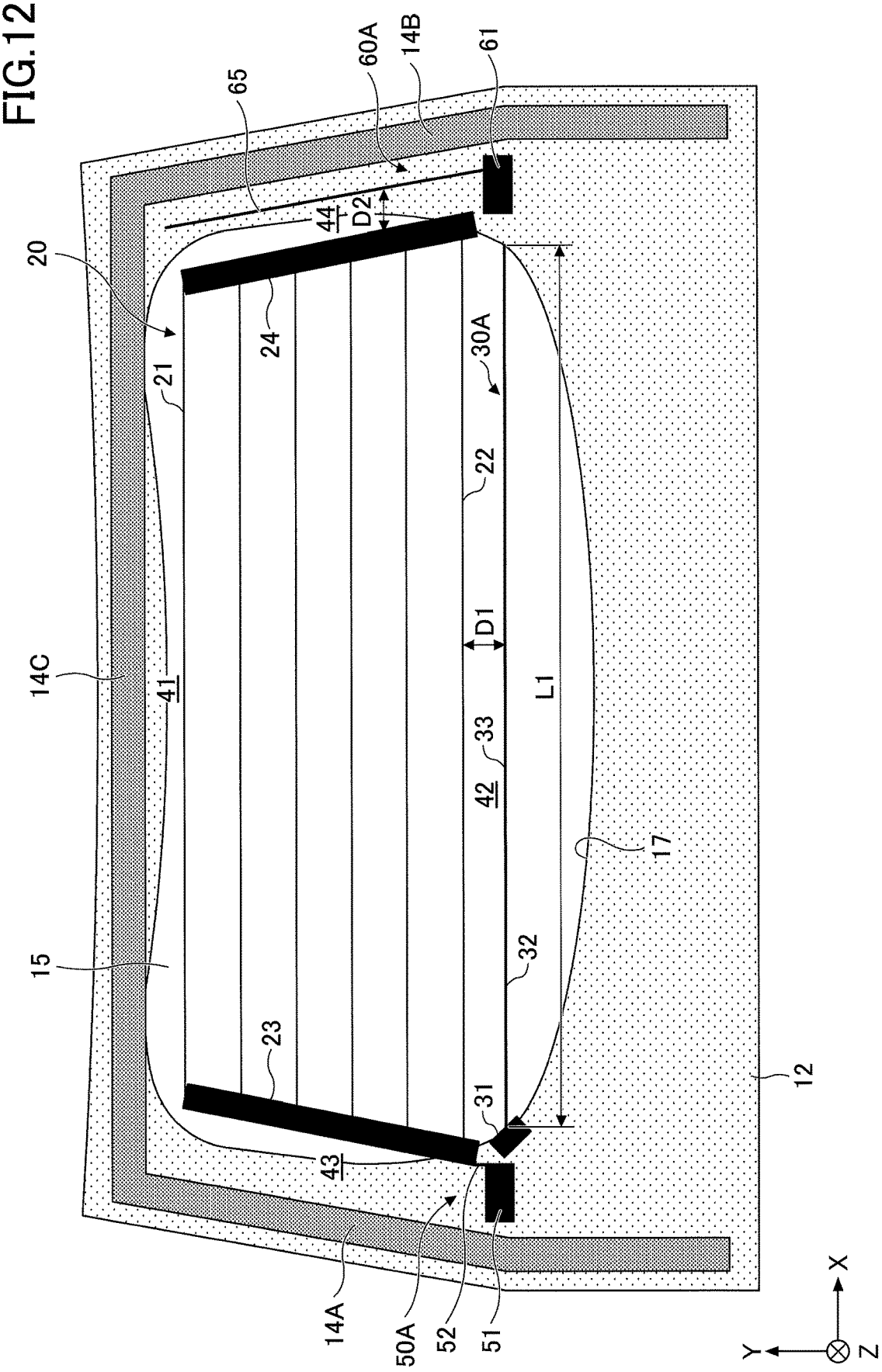
FIG. 12 is a plan view schematically illustrating an eighth configuration example of a backdoor.

FIG. 12 is a plan view schematically illustrating an eighth configuration example of a backdoor from which an inner panel 13 is removed, as viewed from the interior side of the vehicle. Description of similar elements and effects as in the configuration examples described above will be omitted or simplified by quoting the above description herein. FIG. 12 illustrates a rear glass 15 that further includes a third antenna conductor 60A, and in this regard, differs from the configurations described above.

The shape and dimensions of the second antenna conductor 50A and the third antenna conductor 60A are formed to be capable of receiving radio waves in an FM broadcast band. The second antenna conductor 50A has a second power feeding part 51 connected to the defogger 20. The third antenna conductor 60A has a third power feeding part 61 connected or proximate to the defogger 20, and a third antenna element 65 arranged to be separated from the defogger 20 by a spacing D2 of 1 mm to 40 mm.

In the example illustrated in FIG. 12, the third power feeding part 61 is proximate to the lower end of the right edge 24 of the defogger 20, and the third antenna element 65 extends along the right edge 24 and has the spacing D2 of 1 mm and 40 mm from the right edge 24 of the defogger 20. The third antenna element 65 extends from the third power feeding part 61 in a region on the side opposite to the side on which the second power feeding part 51 is positioned (in this case, the right peripheral region 44), among two peripheral regions being a left peripheral region and a right peripheral region that are outside the defogger 20. Note that as long as being capable of receiving only an FM broadcast band, the third antenna conductor 60A simply needs not to contact the reinforcement, and is favorably separated from the reinforcement by longer than or equal to 1 mm, and more favorably separated from the reinforcement by longer than or equal to 3 mm.

According to the configuration in FIG. 12, a signal in an AM broadcast band received and obtained by the first antenna conductor 30A can be extracted from the first power feeding part 31. Also, a signal in an FM broadcast band received by the second antenna conductor 50A can be extracted from the second power feeding part 51; and a signal in an FM broadcast band received by the third antenna conductor 60A can be extracted from the third power feeding part 61. The second antenna conductor 50A and the third antenna conductor 60A enable to realize a diversity antenna that receives an FM broadcast band.

From the viewpoint of improving the reception sensitivity in an FM broadcast band, the total length of the third antenna element 65 is favorably longer than or equal to 100 mm and shorter than or equal to 1400 mm, and more favorably longer than or equal to 100 mm and shorter than or equal to 700 mm.

TABLE 10

| [dB μV] | Horizontal polarization | Vertical polarization |
|---|---|---|
| Antenna 50A | | |
| FM gain | 54.0 | 53.2 |
| Frequency characteristic [AVE-MIN] | 1.2 | 4.1 |
| Antenna 60A | | |
| FM gain | 53.1 | 53.2 |
| Frequency characteristic [AVE-MIN] | 3.9 | 6.6 |

Table 10 shows an example of measurement results of the FM gain and the frequency characteristic in the configuration example illustrated in FIG. 12. According to Table 10, both the second antenna conductor 50A and the third antenna conductor 60A can secure an FM gain and a frequency characteristic required for horizontal polarization and vertical polarization.

Note that when the measurement in Table 10 was performed, the dimensions of the parts illustrated in FIG. 12 were set as follows:

the vertical width of the defogger 20: approximately 300 mm; the lateral width of the defogger 20: approximately 1040 mm; the pitch between the multiple electric heating wires in the defogger 20: 30 mm;

the length of the connection element 52: 40 mm;

the length of the third antenna element 65: 300 mm;

the spacing D2: 5 mm;

the length of the bus bars extending along the left edge 23 and the right edge 24 of the defogger 20: 280 mm;

the width of the bus bars extending along the left edge 23 and the right edge 24 of the defogger 20: 10 to 15 mm;

the distance between the third antenna element 65 and the right reinforcement part 14B: 10 to 30 mm; and the distance between the second power feeding part 51 and the left reinforcement part 14A: 15 mm.

TABLE 11

| | Total length of 3rd antenna element 65 | | |
|---|---|---|---|
| [dB μV] | 500 mm | 300 mm | 100 mm |
| Performance of antenna 50A (horizontal polarization) | | | |
| FM gain | 53.8 | 54.0 | 55.0 |
| Frequency characteristic [AVE-MIN] | 2.2 | 1.2 | 1.9 |
| Performance of antenna 60A (horizontal polarization) | | | |
| FM gain | 52.9 | 53.1 | 48.7 |
| Frequency characteristic [AVE-MIN] | 3.3 | 3.9 | 4.3 |

Table 11 shows an example of measurement results of the FM gain and the frequency characteristic in the case of horizontal polarization, in the configuration example illustrated in FIG. 12, when the total length of the third antenna element 65 of the third antenna conductor 60A was changed to 500 mm, 300 mm, and 100 mm. According to Table 11, both the second antenna conductor 50A and the third antenna conductor 60A can secure an FM gain and a frequency characteristic required for horizontal polarization.

TABLE 12

| [dB μ V] | Total length of 3rd antenna element 65 | | |
|---|---|---|---|
| | 500 mm | 300 mm | 100 mm |
| Performance of antenna 50A (vertical polarization) | | | |
| FM gain | 52.7 | 53.2 | 53.6 |
| Frequency characteristic [AVE-MIN] | 3.3 | 4.1 | 5.1 |
| Performance of antenna 60A (vertical polarization) | | | |
| FM gain | 52.6 | 53.2 | 49.1 |
| Frequency characteristic [AVE-MIN] | 5.4 | 6.6 | 7.7 |

Table 12 shows an example of measurement results of the FM gain and the frequency characteristic in the case of vertical polarization, in the configuration example illustrated in FIG. 12, when the total length of the third antenna element 65 of the third antenna conductor 60A was changed to 500 mm, 300 mm, and 100 mm. According to Table 12, both the second antenna conductor 50A and the third antenna conductor 60A can secure an FM gain and a frequency characteristic required for vertical polarization.

Note that when the measurement in Tables 11 and 12 was performed, the dimensions of the parts illustrated in FIG. 12 were set as follows:
the vertical width of the defogger 20: approximately 300 mm;
the lateral width of the defogger 20: approximately 1040 mm;
the pitch between the multiple electric heating wires in the defogger 20: 30 mm;
the length of the connection element 52: 40 mm;
the spacing D2: 5 mm;
the length of the bus bars extending along the left edge 23 and the right edge 24 of the defogger 20: 280 mm;
the width of the bus bars extending along the left edge 23 and the right edge 24 of the defogger 20: 10 to 15 mm;
the distance between the third antenna element 65 and the right reinforcement part 14B: 10 to 30 mm; and
the distance between the second power feeding part 51 and the left reinforcement part 14A: 15 mm.

Figure 13:
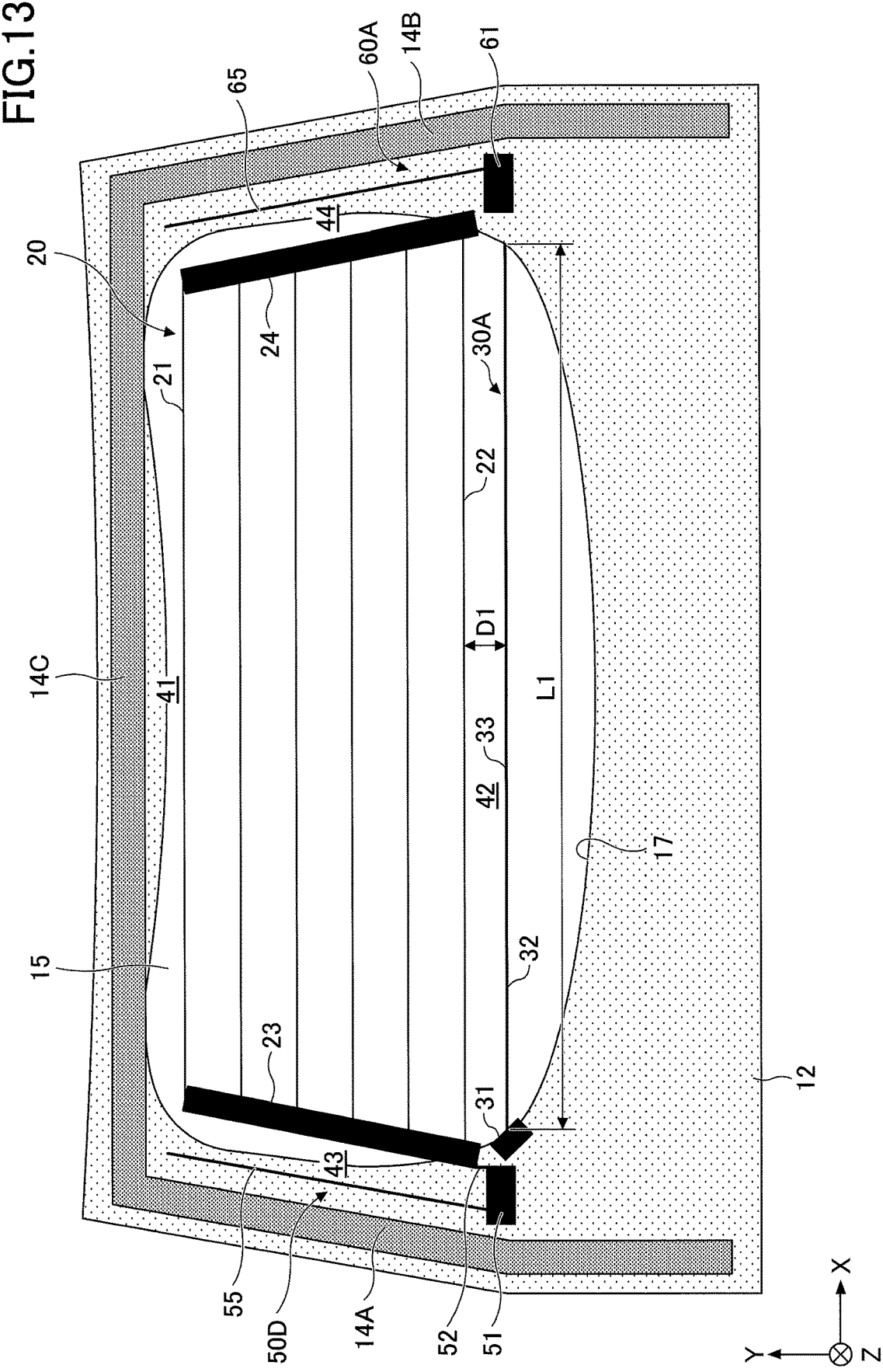
FIG. 13 is a plan view schematically illustrating a ninth configuration example of a backdoor.

FIG. 13 is a plan view schematically illustrating a ninth configuration example of a backdoor from which an inner panel 13 is removed, as viewed from the interior side of the vehicle. Description of similar elements and effects as in the configuration examples described above will be omitted or simplified by quoting the above description herein. FIG. 13 illustrates a configuration including a second antenna conductor 50D, and in this regard, differs from the configurations described above.

The second antenna conductor 50D and the third antenna conductor 60A are both formed to be capable of receiving radio waves in the VHF (Very High Frequency) band of frequencies ranging 30 MHz to 300 MHz. VHF radio waves include radio waves in an FM broadcast band, radio waves in Band III of the DAB standard (174 MHz to 240 MHz), and the like. A radio wave in Band III of the DAB standard is vertically polarized. For example, each of the second antenna conductor 50D and the third antenna conductor 60A is a shared antenna whose shape and dimensions are formed to be capable of receiving radio waves in both a frequency band of FM broadcast waves and Band III of the DAB standard. The second antenna conductor 50D has a second power feeding part 51 connected or proximate to the defogger 20, and a second antenna element 55 arranged to be separated from the defogger 20 by a spacing D2 of 1 mm to 40 mm. The third antenna conductor 60A has a third power feeding part 61 connected or proximate to the defogger 20, and a third antenna element 65 arranged to be separated from the defogger 20 by a spacing D2 of 1 mm to 40 mm. Note that although the configuration illustrated in FIG. 13 has the connection element 52, whether to have the connection element 52 can be determined discretionarily; therefore, as long as the second antenna element 55 is provided, the connection element 52 may be omitted. Note that in the case where the second antenna conductor 50D has the connection element 52, the length of the connection element 52 may be adjusted to be approximately 5 mm to 10 mm.

Both the second antenna conductor 50D and the third antenna conductor 60A may be formed to be capable of receiving radio waves both in the VHF (Very High Frequency) band of frequencies ranging 30 MHz to 300 MHz, and in the UHF (Ultra High Frequency) band of 300 MHz to 3 GHz. Radio waves in the UHF band include radio waves of the digital terrestrial television broadcast ranging 470 MHz to 720 MHz, and the like. A radio wave of the terrestrial digital television broadcast is horizontally polarized. For example, each of the second antenna conductor 50D and the third antenna conductor 60A may be a shared antenna whose shape and dimensions are formed to be capable of receiving radio waves both in a frequency band of FM broadcast waves and in the terrestrial digital television broadcast.

According to the configuration in FIG. 13, the second antenna conductor 50D and the third antenna conductor 60A enable to realize a diversity antenna that receives radio waves in at least one of FM broadcast waves, Band III of the DAB, and waves of the terrestrial digital television broadcast.

Figure 14:
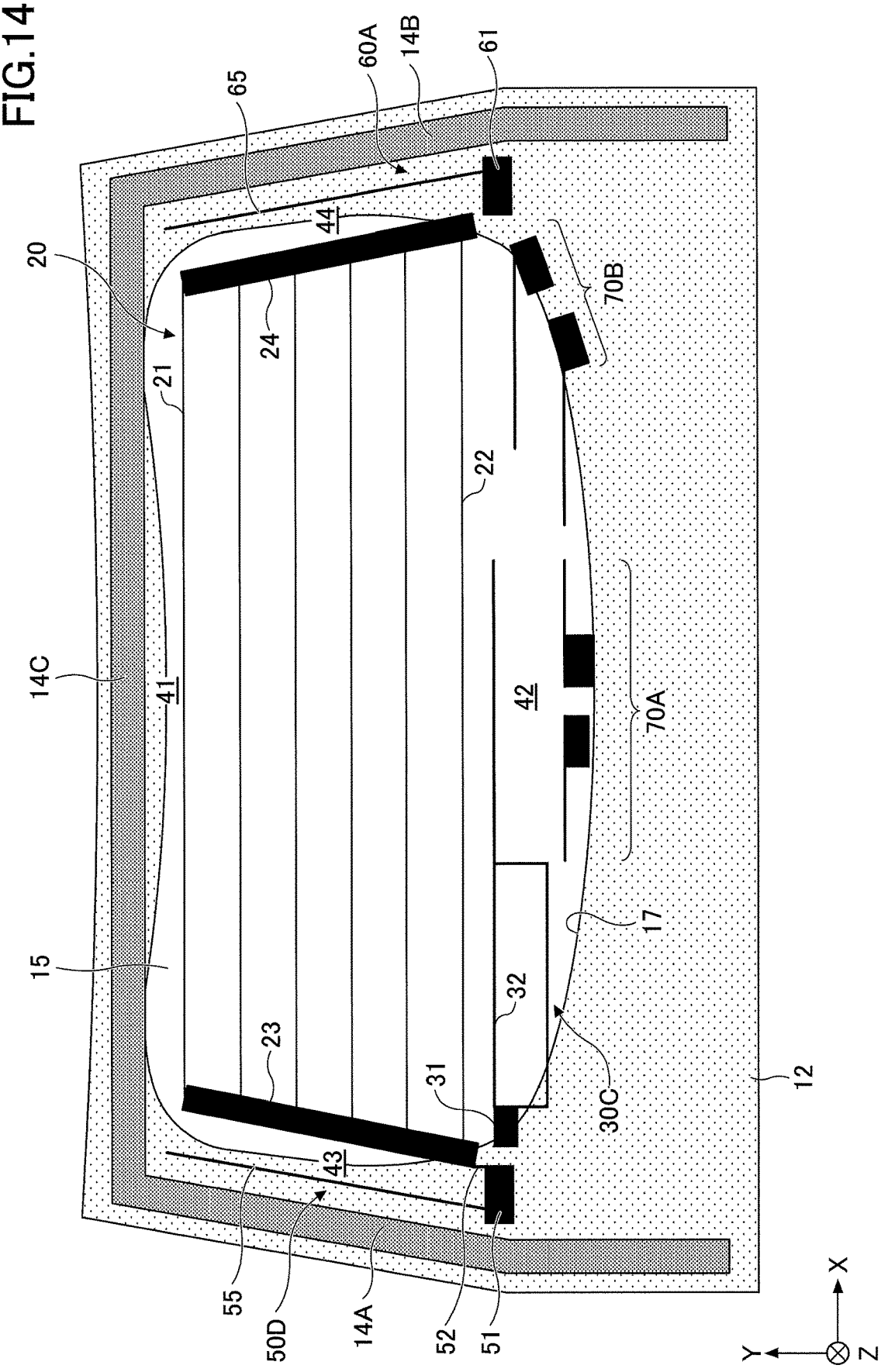
FIG. 14 is a plan view schematically illustrating a tenth configuration example of a backdoor.

FIG. 14 is a plan view schematically illustrating a tenth configuration example of a backdoor from which an inner panel 13 is removed, as viewed from the interior side of the vehicle. Description of similar elements and effects as in the configuration examples described above will be omitted or simplified by quoting the above description herein. FIG. 14 illustrates a configuration including a fourth antenna conductor 70A and a fifth antenna conductor 70B, and in these regards, differs from the configurations described above.

In FIG. 14, the shape and dimensions of a first antenna conductor 30C are designed to be capable of receiving radio waves at least in an AM broadcast band. The first antenna conductor 30C has a first power feeding part 31 and a first antenna element 32 having a total length of 100 mm to 1800 mm connected to the first power feeding part 31. In the example illustrated in FIG. 14, a first antenna element 32 has a linear element, and a loop-shaped element that shares part of the linear element.

The fourth antenna conductor 70A and the fifth antenna conductor 70B are conductors that are capable of receiving radio waves of at least one of FM broadcast waves, Band III of the DAB, and the terrestrial digital television broadcast. Each of the fourth antenna conductor 70A and the fifth antenna conductor 70B has a fourth power feeding part, and a fourth antenna element connected to the fourth power feeding part. In the example illustrated in FIG. 14, the shape and dimensions of the fourth antenna conductor 70A and the fifth antenna conductor 70B are designed to be capable of receiving radio waves in a frequency band of the terrestrial digital television broadcast. The fourth antenna conductor 70A and the fifth antenna conductor 70B enable to realize a diversity antenna that receives radio waves of the terrestrial digital television broadcast.

Figure 15:
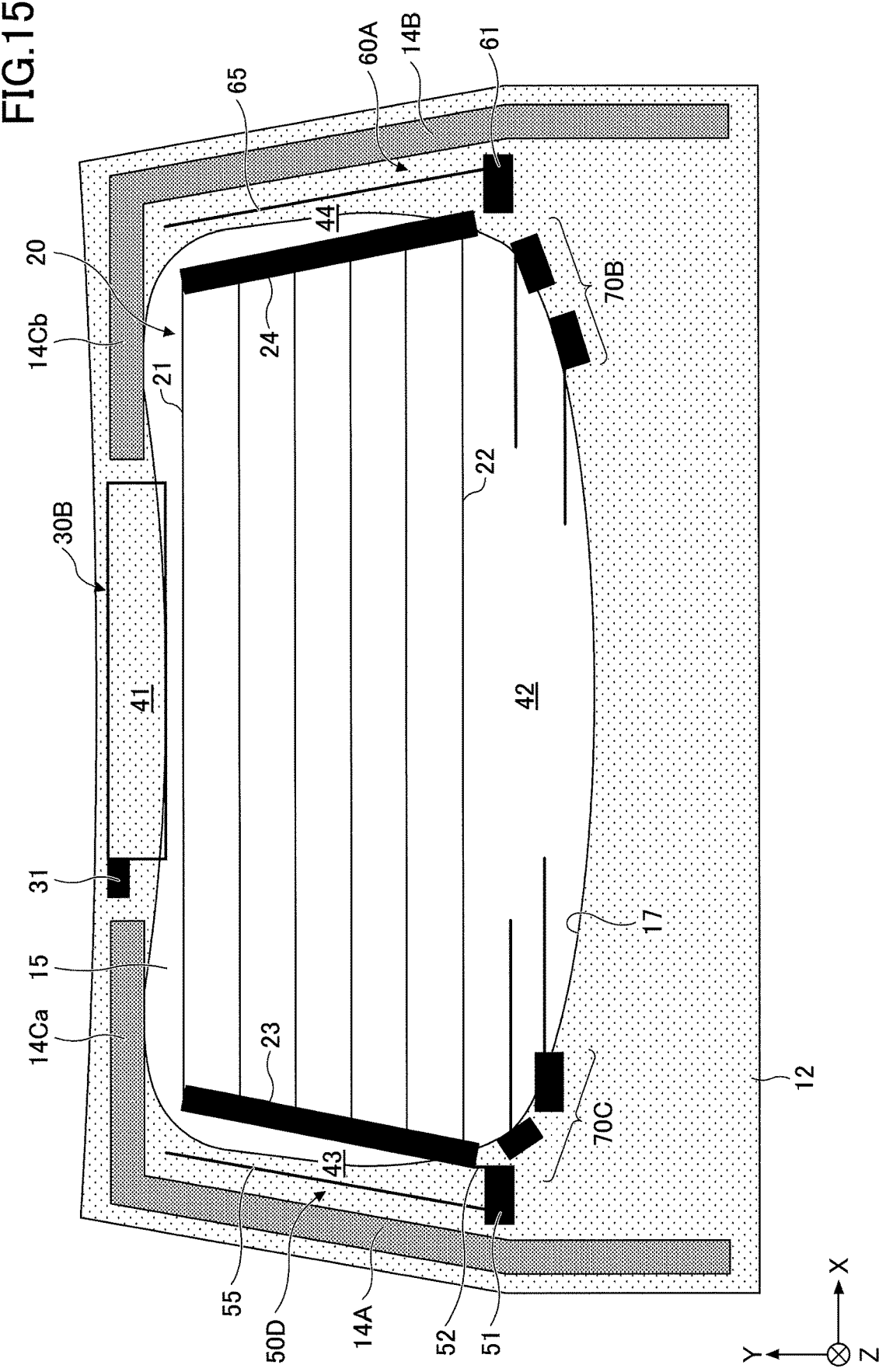
FIG. 15 is a plan view schematically illustrating an eleventh configuration example of a backdoor.

FIG. 15 is a plan view schematically illustrating an eleventh configuration example of a backdoor from which an inner panel 13 is removed, as viewed from the interior side of the vehicle. Description of similar elements and effects as in the configuration examples described above will be omitted or simplified by quoting the above description herein. FIG. 15 illustrates a configuration including a fourth antenna conductor 70C and a fifth antenna conductor 70B, and in these regards, differs from the configurations described above. A first antenna conductor 30B illustrated in FIG. 15 is configured as in FIG. 4.

In FIG. 15, the fourth antenna conductor 70C is a conductor that is capable of receiving radio waves of at least one of FM broadcast waves, Band III of the DAB, and the terrestrial digital television broadcast. In the example illustrated in FIG. 15, the shape and dimensions of the fourth antenna conductor 70C are designed to be capable of receiving radio waves in a frequency band of the terrestrial digital television broadcast. The fourth antenna conductor 70C and the fifth antenna conductor 70B enable to realize a diversity antenna that receives radio waves of the terrestrial digital television broadcast.

TABLE 13

| [dB μ V] | Horizontal polarization | Vertical polarization |
|---|---|---|
| FM gain | 52.8 | 51.9 |
| Frequency characteristic [AVE-MIN] | 7.4 | 5.1 |

Table 13 shows an example of measurement results of the FM gain and the frequency characteristic in the form illustrated in FIG. 4 (though without the lower reinforcement part 14D), in the case where the first antenna conductor 30B was a shared antenna formed to be capable of receiving radio waves in an AM broadcast band and in an FM broadcast band. In this case, L2=800 mm, L3=10 mm, and D1=20 mm. According to Table 13, it is possible to secure an FM gain and a frequency characteristic required for vertical polarization and horizontal polarization. In this case, as the AM gain, 47 dBμV is obtained, and thus, it is possible to secure a required AM gain.

Table 14 shows an example of measurement results of the FM gain and the frequency characteristic in the form illustrated in FIG. 4 (though without the lower reinforcement part 14D), in the case where the first antenna conductor 30B was a shared antenna formed to be capable of receiving radio waves in an AM broadcast band and in an FM broadcast band. In this case, the length of the loop of the first antenna conductor 30B was varied. According to Table 14, for any loop length within 400 mm to 900 mm, it is possible to secure an FM gain and a frequency characteristic required for vertical polarization and horizontal polarization.

Figure 16:
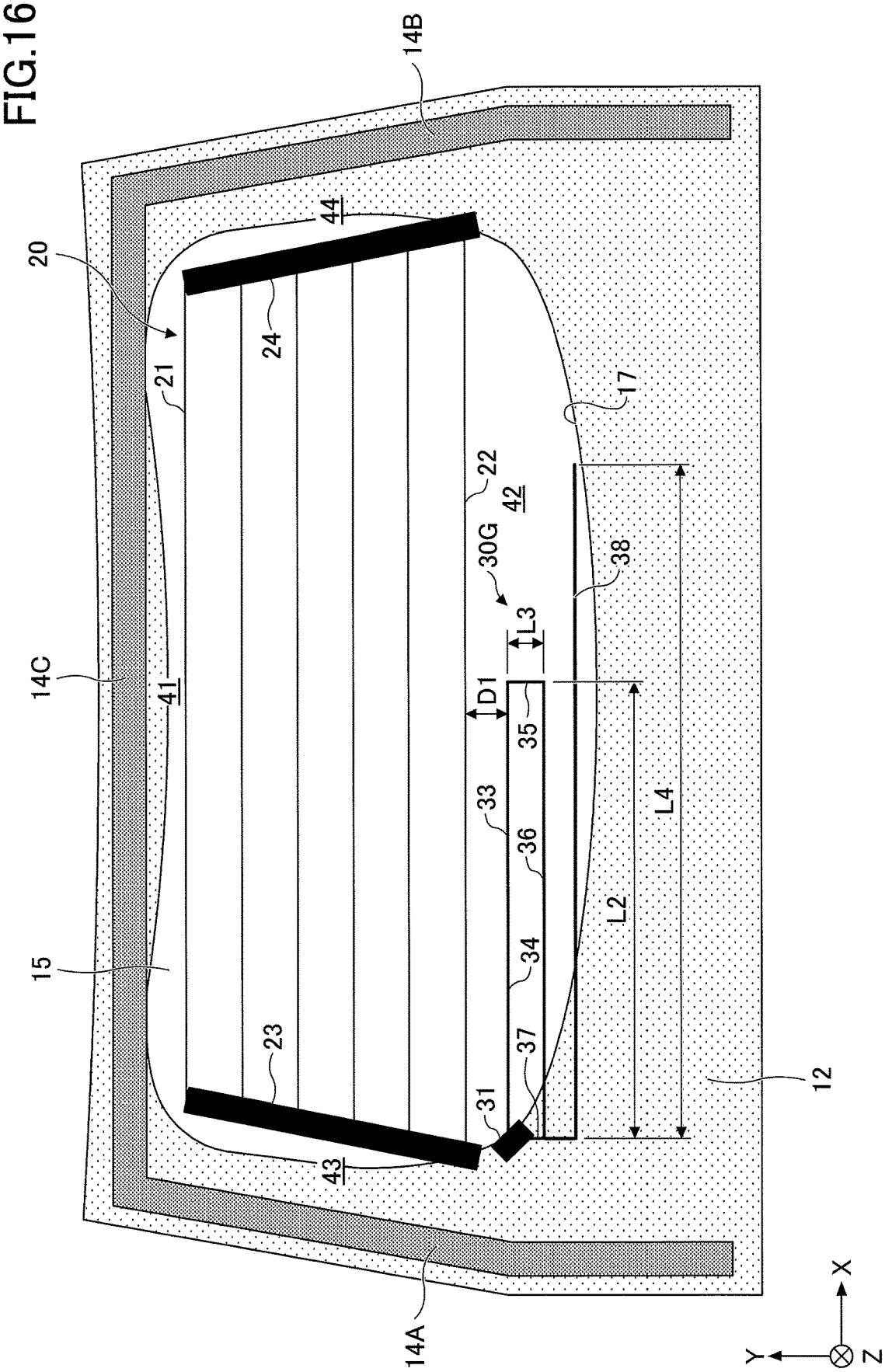
FIG. 16 is a plan view schematically illustrating a twelfth configuration example of a backdoor.

FIG. 16 is a plan view schematically illustrating a twelfth configuration example of a backdoor from which an inner panel 13 is removed, as viewed from the interior side of the vehicle. Description of similar elements and effects as in the configuration examples described above will be omitted or simplified by quoting the above description herein. FIG. 16 illustrates a configuration including a first antenna conductor 30G capable of receiving radio waves in an AM broadcast band, and in this regard, differs from the configurations described above.

The first antenna conductor 30G further includes a wire element 38 connected directly or indirectly to a loop-shaped first antenna elements 34 to 37. The wire element 38 may be connected to the first antenna elements 34 to 37 or the first power feeding part 31. The shape of the wire element 38 illustrated in FIG. 16 is an L-shape, but not limited as such. The wire element 38 has a wire part extending along a long side (in this case, the element 36) of a rectangle formed by the first antenna elements 34 to 37 on the opposite side of the defogger 20 with respect to the first antenna elements 34 to 37. This wire part extends in the lateral direction (horizontal direction) in a region located lower than the element part 36.

Also, if the distance between the lower edge 22 and the element part 34 (e.g., spacing D1) is 3 mm to 30 mm, and the length of the short sides of the rectangle is 3 mm to 50 mm, the first antenna conductor 30G can receive radio waves in both frequency bands of AM broadcast waves and of FM broadcast waves. In other words, the first antenna conductor 30G can serve as a shared antenna capable of receiving an AM broadcast band and an FM broadcast band.

TABLE 14

| | Horizontal polarization | | | | | |
|---|---|---|---|---|---|---|
| [dB μ V] | Length of loop | | | | | |
| | 900 mm | 800 mm | 700 mm | 600 mm | 500 mm | 400 mm |
| FM gain | 50.9 | 51.4 | 52.2 | 52.6 | 51.3 | 44.8 |
| Frequency characteristic [AVE-MIN] | 9.3 | 7.8 | 8.6 | 9.2 | 7.1 | 5.8 |

| | Vertical polarization | | | | | |
|---|---|---|---|---|---|---|
| [dB μ V] | Length of loop | | | | | |
| | 900 mm | 800 mm | 700 mm | 600 mm | 500 mm | 400 mm |
| FM gain | 48.2 | 49.9 | 50.5 | 50.9 | 52.5 | 49.7 |
| Frequency characteristic [AVE-MIN] | 7.3 | 5.4 | 4.9 | 5.5 | 6.1 | 6.8 |

TABLE 15

| [dB μ V] | Horizontal polarization | Vertical polarization |
|---|---|---|
| FM gain | 55.6 | 53.9 |
| Frequency characteristic [AVE-MIN] | 3.7 | 2.9 |

Table 15 shows an example of measurement results of the FM gain and the frequency characteristic in the form illustrated in FIG. 16, in the case where the first antenna conductor 30G was a shared antenna formed to be capable of receiving radio waves both frequency bands of an AM broadcast band and of an FM broadcast band. In this case, L2=500 mm, L3=10 mm, L4=800 mm, D1=5 mm, and the spacing between the first antenna element 36 and the wire element 38=10 mm. According to Table 15, it is possible to secure an FM gain and a frequency characteristic required for vertical polarization and horizontal polarization. In this case, as the AM gain, 44 dBμV is obtained, and thus, it is possible to secure a required AM gain.

TABLE 16

| [dB μ V] | Length of loop | | | |
|---|---|---|---|---|
| | 900 mm | 700 mm | 500 mm | 300 mm |
| Horizontal polarization | | | | |
| FM gain | 51.1 | 53.4 | 55.6 | 53.8 |
| Frequency characteristic [AVE-MIN] | 7.5 | 8.7 | 3.7 | 8.8 |
| Vertical polarization | | | | |
| FM gain | 47.4 | 52.3 | 53.9 | 51.5 |
| Frequency characteristic [AVE-MIN] | 5.6 | 3.5 | 2.9 | 10.1 |

Table 16 shows an example of measurement results of the FM gain and the frequency characteristic in the form illustrated in FIG. 16, in the case where the first antenna conductor 30G was a shared antenna formed to be capable of receiving radio waves both in an AM frequency band and in an FM frequency band. In this case, the length of the loop of the first antenna conductor 30G was varied. Specifically, with fixed values of D1=5 mm, L3=10 mm, and a spacing of 10 mm between the first antenna element 36 and the wire element 38, the value of L2 was adjusted to be 300 mm to 900 mm. According to Table 16, for any loop length within 300 mm to 900 mm, it is possible to secure an FM gain and a frequency characteristic required for vertical polarization and horizontal polarization.

TABLE 17

| [dB μ V] | D1 | | |
|---|---|---|---|
| | 5 mm | 10 mm | 20 mm |
| Horizontal polarization | | | |
| FM gain | 55.6 | 55.5 | 55.0 |
| Frequency characteristic [AVE-MIN] | 3.7 | 4.8 | 5.6 |
| Vertical polarization | | | |
| FM gain | 53.9 | 53.8 | 53.2 |
| Frequency characteristic [AVE-MIN] | 3.3 | 5.2 | 4.1 |

Table 17 shows an example of measurement results of the FM gain and the frequency characteristic in the form illustrated in FIG. 16, in the case where the first antenna conductor 30G was a shared antenna formed to be capable of receiving radio waves in an AM broadcast band and in an FM broadcast band. In this case, the spacing D1 was varied. According to Table 17, for any spacing D1 within 5 mm to 20 mm, it is possible to secure an FM gain and a frequency characteristic required for vertical polarization and horizontal polarization.

Note that when the measurement in Table 17 was performed, the dimensions of the parts illustrated in FIG. 16 were set as follows:
the vertical width of the defogger 20: approximately 300 mm;
the lateral width of the defogger 20: approximately 1040 mm;
the pitch between the multiple electric heating wires in the defogger 20: 30 mm;
L2: 500 mm;
L3: 10 mm;
L4: 800 mm;
the spacing between the first antenna element 36 and the wire element 38=10 mm;
the length of the bus bars extending along the left edge 23 and the right edge 24 of the defogger 20: 280 mm; and
the width of the bus bars extending along the left edge 23 and the right edge 24 of the defogger 20: 10 to 15 mm.

Figure 17:
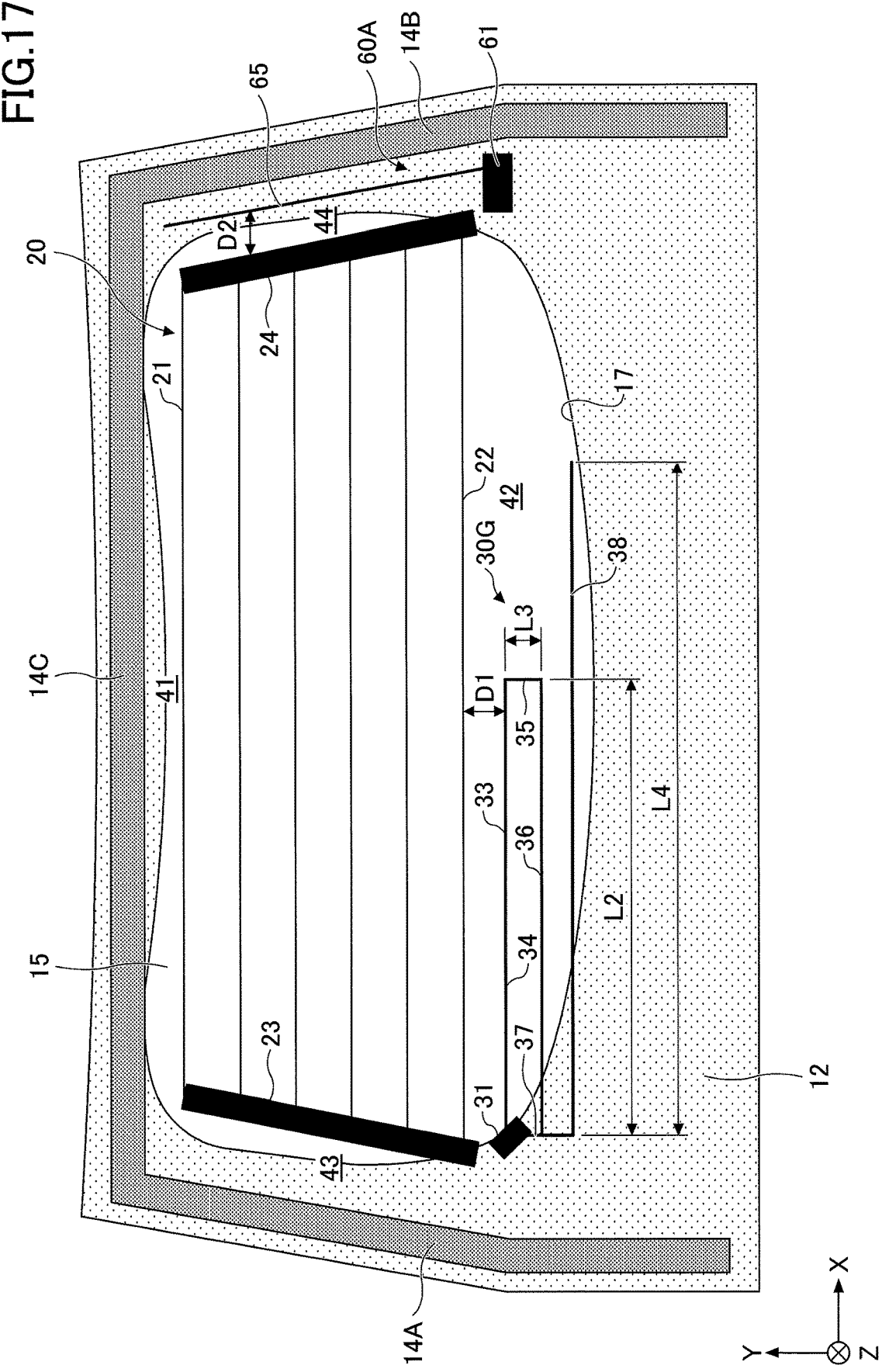
FIG. 17 is a plan view schematically illustrating a thirteenth configuration example of a backdoor.

FIG. 17 is a plan view schematically illustrating a thirteenth configuration example of a backdoor from which an inner panel 13 is removed, as viewed from the interior side of the vehicle. Description of similar elements and effects as in the configuration examples described above will be omitted or simplified by quoting the above description herein. FIG. 17 illustrates a configuration including a third antenna conductor 60A, and in this regard, differs from the configurations described above.

A first antenna conductor 30G is a shared antenna formed to be capable of receiving radio waves in an AM broadcast band and in an FM broadcast band, and the third antenna conductor 60A is an antenna formed to be capable of receiving radio waves in an FM broadcast band.

TABLE 18

| [dB μ V] | Horizontal polarization | Vertical polarization |
|---|---|---|
| Antenna 30G | | |
| FM gain | 52.5 | 51.2 |
| Frequency characteristic [AVE-MIN] | 7.5 | 9.8 |
| Antenna 60A | | |
| FM gain | 54.3 | 53.7 |
| Frequency characteristic [AVE-MIN] | 1.6 | 5.4 |

Table 18 shows an example of measurement results of the FM gain and the frequency characteristic in the form illustrated in FIG. 17. According to Table 18, both of the first antenna conductor 30G and the third antenna conductor 60A can secure an FM gain and a frequency characteristic required for vertical polarization and horizontal polarization. Therefore, the first antenna conductor 30G and the third antenna conductor 60A enable to realize a diversity antenna that receives radio waves in an FM broadcast band.

Note that when the measurement in Table 18 was performed, the dimensions of the parts illustrated in FIG. 17 were set as follows:
the vertical width of the defogger 20: approximately 300 mm;
the lateral width of the defogger 20: approximately 1040 mm;
the pitch between the multiple electric heating wires in the defogger 20: 30 mm;
L2: 500 mm;
L3: 10 mm;
L4: 800 mm;
the spacing between the first antenna element 36 and the wire element 38=10 mm;
the length of the third antenna element 65: 300 mm;
the spacing D1: 5 mm;
the spacing D2: 5 mm;
the length of the bus bars extending along the left edge 23 and the right edge 24 of the defogger 20: 280 mm; and
the width of the bus bars extending along the left edge 23 and the right edge 24 of the defogger 20: 10 to 15 mm.

In addition, the distance between the third antenna element 65 and the right reinforcement part 14B: 10 to 30 mm.

TABLE 19

| [dB μ V] | Total length of 3rd antenna element 65 | | |
|---|---|---|---|
| | 550 mm | 350 mm | 150 mm |
| Antenna 30G (horizontal polarization) | | | |
| FM gain | 52.6 | 52.5 | 52.9 |
| Frequency characteristic [AVE-MIN] | 7.7 | 7.5 | 7.7 |
| Antenna 60A (horizontal polarization) | | | |
| FM gain | 53.8 | 54.3 | 51.5 |
| Frequency characteristic [AVE-MIN] | 1.9 | 1.6 | 1.8 |

Table 19 shows an example of measurement results of the FM gain and the frequency characteristic in the form illustrated in FIG. 17, when the total length of the third antenna element 65 of the third antenna conductor 60A was varied. According to Table 19, both the first antenna conductor 30G and the third antenna conductor 60A can secure an FM gain and a frequency characteristic required for horizontal polarization, as long as the total length of the third antenna element 65 is within 150 mm and 550 mm.

TABLE 20

| [dB μ V] | Total length of 3rd antenna element 65 | | |
|---|---|---|---|
| | 550 mm | 350 mm | 150 mm |
| Antenna 30G (vertical polarization) | | | |
| FM gain | 50.9 | 51.2 | 51.7 |
| Frequency characteristic [AVE-MIN] | 10.3 | 9.8 | 9.8 |
| Antenna 60A (vertical polarization) | | | |
| FM gain | 52.6 | 53.7 | 51.1 |
| Frequency characteristic [AVE-MIN] | 4.9 | 5.4 | 6.2 |

Table 20 shows an example of measurement results of the FM gain and the frequency characteristic in the form illustrated in FIG. 17, when the total length of the third antenna element 65 of the third antenna conductor 60A was varied. According to Table 20, both the first antenna conductor 30G and the third antenna conductor 60A can secure an FM gain and a frequency characteristic required for vertical polarization, as long as the total length of the third antenna element 65 is within 150 mm and 550 mm.

Note that when the measurement in Tables 19 and 20 was performed, the dimensions of the parts illustrated in FIG. 17 were set as follows:
the vertical width of the defogger 20: approximately 300 mm;
the lateral width of the defogger 20: approximately 1040 mm;
the pitch between the multiple electric heating wires in the defogger 20: 30 mm;
L2: 500 mm;
L3: 10 mm;
L4: 800 mm;
the spacing between the first antenna element 36 and the wire element 38=10 mm;
the spacing D1: 5 mm;
the spacing D2: 5 mm;
the length of the bus bars extending along the left edge 23 and the right edge 24 of the defogger 20: 280 mm; and
the width of the bus bars extending along the left edge 23 and the right edge 24 of the defogger 20: 10 to 15 mm.

In addition, the distance between the third antenna element 65 and the right reinforcement part 14B: 10 to 30 mm.

TABLE 21

| [dB μ V] | D2 | | |
|---|---|---|---|
| | 5 mm | 10 mm | 20 mm |
| Antenna 30G (horizontal polarization) | | | |
| FM gain | 52.5 | 52.9 | 53.4 |
| Frequency characteristic [AVE-MIN] | 7.5 | 7.5 | 8.2 |
| Antenna 60A (horizontal polarization) | | | |
| FM gain | 54.3 | 53.4 | 50.7 |
| Frequency characteristic [AVE-MIN] | 1.6 | 1.5 | 2.0 |

Table 21 shows an example of measurement results of the FM gain and the frequency characteristic in the form illustrated in FIG. 17, when the spacing D2 between the third antenna conductor 60A and the defogger 20 was varied. According to Table 21, both the first antenna conductor 30G and the third antenna conductor 60A can secure an FM gain and a frequency characteristic required for horizontal polarization, as long as the spacing D2 is within 5 mm to 20 mm.

TABLE 22

| [dB μ V] | D2 | | |
|---|---|---|---|
| | 5 mm | 10 mm | 20 mm |
| Antenna 30G (vertical polarization) | | | |
| FM gain | 51.2 | 51.2 | 51.3 |
| Frequency characteristic [AVE-MIN] | 9.8 | 9.6 | 9.7 |
| Antenna 60A (vertical polarization) | | | |
| FM gain | 53.7 | 53.2 | 50.8 |
| Frequency characteristic [AVE-MIN] | 5.4 | 6.3 | 6.7 |

Table 22 shows an example of measurement results of the FM gain and the frequency characteristic in the form illustrated in FIG. 17, when the spacing D2 between the third antenna conductor 60A and the defogger 20 was varied. According to Table 22, both the first antenna conductor 30G and the third antenna conductor 60A can secure an FM gain and a frequency characteristic required for vertical polarization, as long as the spacing D2 is within 5 mm to 20 mm.

Note that when the measurement in Tables 21 and 22 was performed, the dimensions of the parts illustrated in FIG. 17 were set as follows:
the vertical width of the defogger 20: approximately 300 mm;
the lateral width of the defogger 20: approximately 1040 mm;
the pitch between the multiple electric heating wires in the defogger 20: 30 mm;
L2: 500 mm;
L3: 10 mm;
L4: 800 mm;
the spacing between the first antenna element 36 and the wire element 38=10 mm;
the spacing D1: 5 mm;
the length of the third antenna element 65: 350 mm;
the length of the bus bars extending along the left edge 23 and the right edge 24 of the defogger 20: 280 mm; and
the width of the bus bars extending along the left edge 23 and the right edge 24 of the defogger 20: 10 to 15 mm.

In addition, the distance between the third antenna element 65 and the right reinforcement part 14B: 10 to 30 mm.

Figure 18:
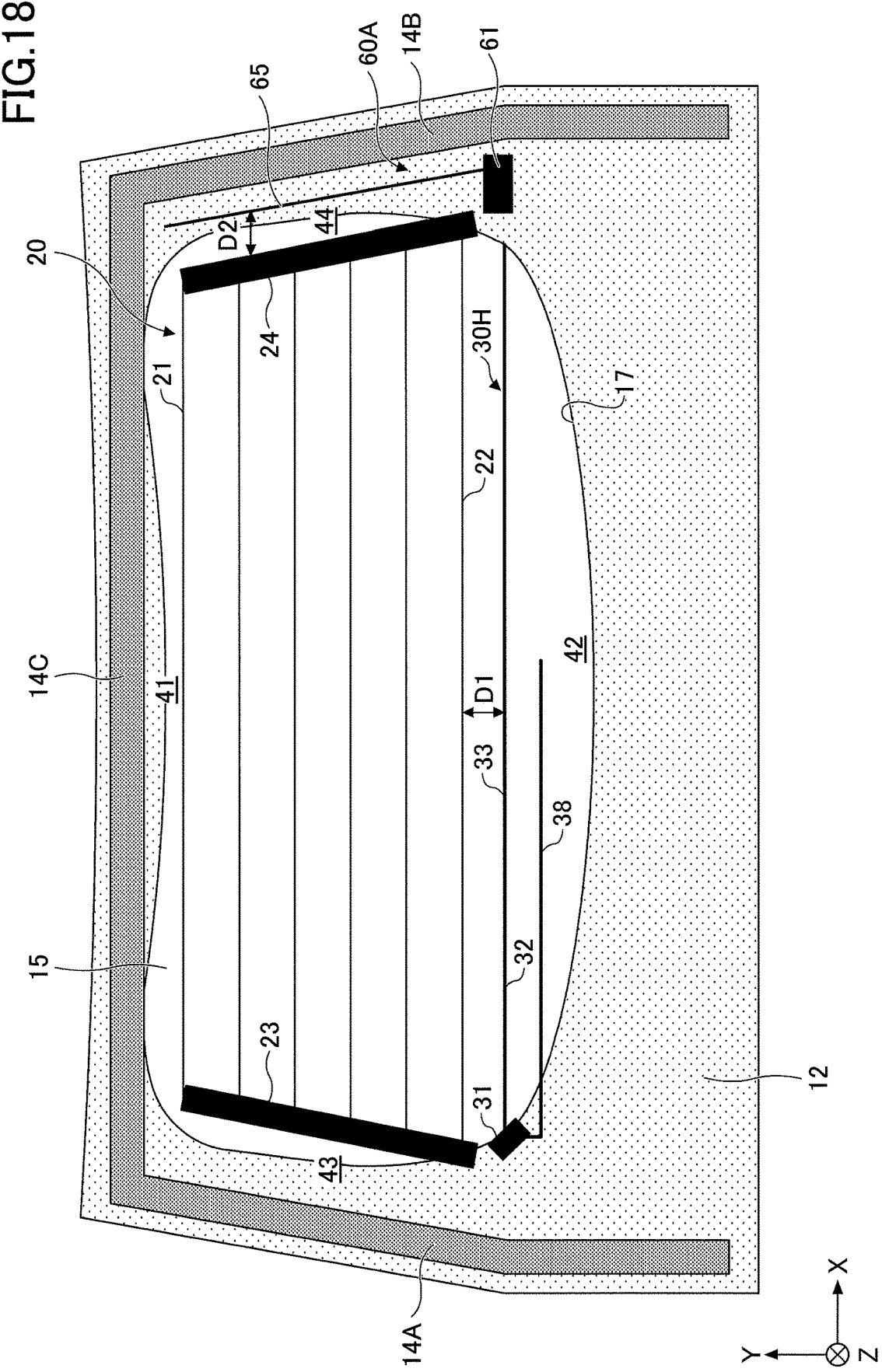
FIG. 18 is a plan view schematically illustrating a fourteenth configuration example of a backdoor.

FIG. 18 is a plan view schematically illustrating a fourteenth configuration example of a backdoor from which an inner panel 13 is removed, as viewed from the interior side of the vehicle. Description of similar elements and effects as in the configuration examples described above will be omitted or simplified by quoting the above description herein. FIG. 18 illustrates a configuration including a first antenna conductor 30H capable of receiving radio waves in an AM broadcast band, and in this regard, differs from the configurations described above.

The first antenna conductor 30H further includes a wire element 38 connected directly or indirectly to a linear first antenna element 32. The wire element 38 may be connected to the first antenna element 32 or to the first power feeding part 31. The shape of the wire element 38 illustrated in FIG. 18 is an L-shape, but not limited as such. The wire element 38 has a wire part extending along the first antenna element 32 on the opposite side of the defogger 20 with respect to the first antenna element 32. This wire part extends in the lateral direction (horizontal direction) in a region located lower than the first antenna element 32.

The first antenna conductor 30H is a shared antenna formed to be capable of receiving radio waves in an AM broadcast band and in an FM broadcast band, and the third antenna conductor 60A is an antenna formed to be capable of receiving radio waves in an FM broadcast band and in Band III of the DAB. Therefore, the first antenna conductor 30H and the third antenna conductor 60A enable to realize a diversity antenna that receives an FM broadcast band.

Note that in FIG. 18, in a region on the lower side of the first antenna conductor 30H (e.g., in the rear glass 15, the outer panel 12, or the inner panel 13), one or more antenna conductors may be formed to be capable of receiving radio waves of the terrestrial digital television broadcast. Such multiple antenna conductors famed to be capable of receiving radio waves of the terrestrial digital television broadcast may be arranged in the peripheral regions 41 and 42, respectively.

As described above, backdoors and rear glasses have been described with the embodiments; note that the present inventive concept is not limited to the embodiments described above. Various modifications and improvements such as combinations and substitutions with some or all of the other embodiments can be made within the scope of present inventive concept.

For example, an "end" of an element may be the start point or end point of an extending element, or may be a conductive part close to or in the vicinity of the start point or end point. Also, an "end" of an element may be formed to be bent or folded. The "end" may include "one end", "the other end", a "tip", a "terminal", or an "open end". Also, a connection part between elements may be connected with a curvature.

Also, an antenna element and an electrode (power feeding part) are formed by, for example, printing a paste containing a conductive metal (e.g., silver paste) onto a surface of a window glass on the interior side of a vehicle. However, the method of forming an antenna element and an electrode is not limited to this method. For example, an antenna element or an electrode may be formed by providing a linear member or a foil member containing a conductive material such as copper on the interior-side surface or the exterior-side surface of a window glass of a vehicle. Alternatively, such an antenna element or electrode may be attached to the window glass by an adhesive or the like, or may be provided inside the window glass itself.

As the shape of an electrode, a rectangular or polygonal shape, for example, a square, virtually square, rectangular, or virtually rectangular shape is favorable in consideration of the mounting. Note that the shape may be a circular shape, which may be circular, virtually circular, elliptical, virtually elliptical, or the like.

Also, a conductive layer forming at least one of an antenna element and an electrode may be provided inside or on a surface of a synthetic resin film, and a configuration may be adopted in which the synthetic resin film having the conductive layer is provided on the interior-side surface or the exterior-side surface of a window glass of a vehicle. Further, a configuration may be adopted in which a flexible circuit board on which at least one of the antenna element and the electrode is formed is provided on the interior-side surface or the exterior-side surface of a window glass of a vehicle.

The invention claimed is:

1. A backdoor comprising:
an outer panel made of resin and having an opening formed;
an inner panel made of resin;
a reinforcement made of metal and arranged between the outer panel and the inner panel; and
a rear glass covering the opening,
wherein the rear glass includes a defogger, and a first antenna conductor capable of receiving a radio wave in a frequency band of AM broadcast waves,
wherein the first antenna conductor includes a first power feeding part, and a first antenna element having a total length of 100 mm to 1800 mm and connected to the first power feeding part,
wherein the first power feeding part is positioned at an edge of the rear glass, at a location between the antenna element and the reinforcement in plan view of the rear glass, at an end of the antenna conductor nearest the reinforcement, wherein the first antenna element includes a first proximity part extending along a lower outer edge of the defogger, and having a spacing of 3 mm to 60 mm from the lower outer edge, and wherein the first antenna element is positioned to be separated from the reinforcement by longer than or equal to 10 mm, or positioned on a side with respect to the lower outer edge where the reinforcement is not present in plan view of the rear glass, wherein the reinforcement serves as a ground of a body of a vehicle containing the backdoor.

2. The backdoor as claimed in claim 1, wherein the first antenna element is arranged only in a lower peripheral region among four of upper, lower, left, and right peripheral regions outside the defogger, or arranged only in two peripheral regions including the lower peripheral region, the two peripheral regions being adjacent to each other.

3. The backdoor as claimed in claim 1, wherein the first antenna element is arranged so as not to overlap the reinforcement in plan view of the rear glass.

4. The backdoor as claimed in claim 3, wherein the first antenna conductor is arranged so as not to overlap the reinforcement in plan view of the rear glass.

5. The backdoor as claimed in claim 1, wherein a length of the first proximity part extending along the lower outer edge and having the spacing of 3 mm to 60 mm from the lower outer edge, is longer than or equal to 100 mm.

6. The backdoor as claimed in claim 1, wherein an antenna capacitance of the first antenna element with respect to a vehicle-body ground is 5 pF to 30 pF.

7. The backdoor as claimed in claim 1, wherein the first antenna element includes a linear element that is arranged only in one peripheral region among four of upper, lower, left, and right peripheral regions outside the defogger.

8. The backdoor as claimed in claim 7, wherein an area of the linear element is $0.0001 \text{ m}^2$ to $0.001 \text{ m}^2$.

9. The backdoor as claimed in claim 1, wherein the first antenna element includes a loop-shaped element that is arranged only in a lower peripheral region among four of upper, lower, left, and right peripheral regions outside the defogger.

10. The backdoor as claimed in claim 9, wherein an area surrounded by a loop of the loop-shaped element is $0.01 \text{ m}^2$ to $0.05 \text{ m}^2$.

11. The backdoor as claimed in claim 9, wherein a shape of the loop-shaped element is a rectangle having a long side along a horizontal direction in which the lower outer edge extends, and a length of a short side of the rectangle is shorter than or equal to 80 mm.

12. The backdoor as claimed in claim 11, wherein a length of the long side of the rectangle is shorter than or equal to ¾ a length of the lower outer edge.

13. The backdoor as claimed in claim 11, wherein a distance between the lower outer edge and the first antenna element is 3 mm to 30 mm, and the length of the short side of the rectangle is 3 mm to 50 mm, and wherein the first antenna conductor is further capable of receiving a radio wave in a frequency band of FM broadcast waves.

14. The backdoor as claimed in claim 11, wherein a distance between the lower outer edge and the first antenna element is 3 mm to 30 mm, and the length of the short side of the rectangle is 3 mm to 50 mm, wherein the first antenna conductor further includes a wire element connected directly or indirectly to the first antenna element, wherein the wire element includes a part extending along the long side of the rectangle on a side opposite to the defogger with respect to the first antenna element, and wherein the first antenna conductor is further capable of receiving a radio wave in a frequency band of FM broadcast waves.

15. The backdoor as claimed in claim 1, wherein the first antenna element is arranged only in a region located lower than the defogger.

16. The backdoor as claimed in claim 1, wherein the first antenna element further includes a second proximity part extending along a second outer edge connected to the lower outer edge among the left and right outer edges of the defogger, and having a spacing of 10 mm to 40 mm from the second outer edge.

17. The backdoor as claimed in claim 16, wherein the first proximity part is arranged in a region located lower than the defogger.

18. The backdoor as claimed in claim 1, wherein the rear glass further includes a second antenna conductor capable of receiving a radio wave in a frequency band of FM broadcast waves, wherein the first antenna conductor is arranged in a region located lower than the defogger, wherein the second antenna conductor includes a second power feeding part connected or proximate to the defogger, and a second antenna element arranged to be separated from the defogger by a spacing of 1 mm to 40 mm, wherein the second antenna element extends from the second power feeding part, through one of two peripheral regions being a left peripheral region and a right peripheral region that are outside the defogger, to a region located higher than the defogger.

19. The backdoor as claimed in claim 1, wherein the rear glass further includes an antenna conductor capable of receiving a radio wave in at least one of frequency bands of FM broadcast waves, Band III of DAB, and terrestrial digital television broadcast, and wherein the antenna conductor includes a power feeding part, and an antenna element connected to the power feeding part.

20. A rear glass that can be attached to a backdoor made of resin so as to cover an opening formed in the backdoor, and the backdoor having a reinforcement made of metal, comprising:

a defogger; and a first antenna conductor capable of receiving a radio wave in a frequency band of AM broadcast waves, wherein the first antenna conductor includes a first power feeding part, and a first antenna element having a total length of 100 mm to 1800 mm connected to the first power feeding part, wherein the first power feeding part is positioned at an edge of the rear glass, at a location between the antenna element and the reinforcement in plan view of the rear glass, at an end of the antenna conductor nearest the reinforcement, wherein the first antenna element includes a first proximity part extending along a lower outer edge of the defogger and having a spacing of 3 mm to 60 mm from the lower outer edge, and wherein in a state of being attached to the backdoor, the first antenna element is positioned to be separated from the reinforcement by longer than or equal to 10 mm, or positioned on a side with respect to the lower outer edge where the reinforcement is not present in plan view of the rear glass, and wherein the reinforcement serves as a ground of a body of a vehicle containing the backdoor.

\* \* \* \* \*